Dec. 28, 1965  W. R. POSTLEWAITE  3,225,826
METHOD AND APPARATUS FOR WORKING ON SUBMERGED WELLS
Filed Nov. 5, 1962  8 Sheets-Sheet 1

INVENTOR
WILLIAM R. POSTLEWAITE
BY
ATTORNEYS

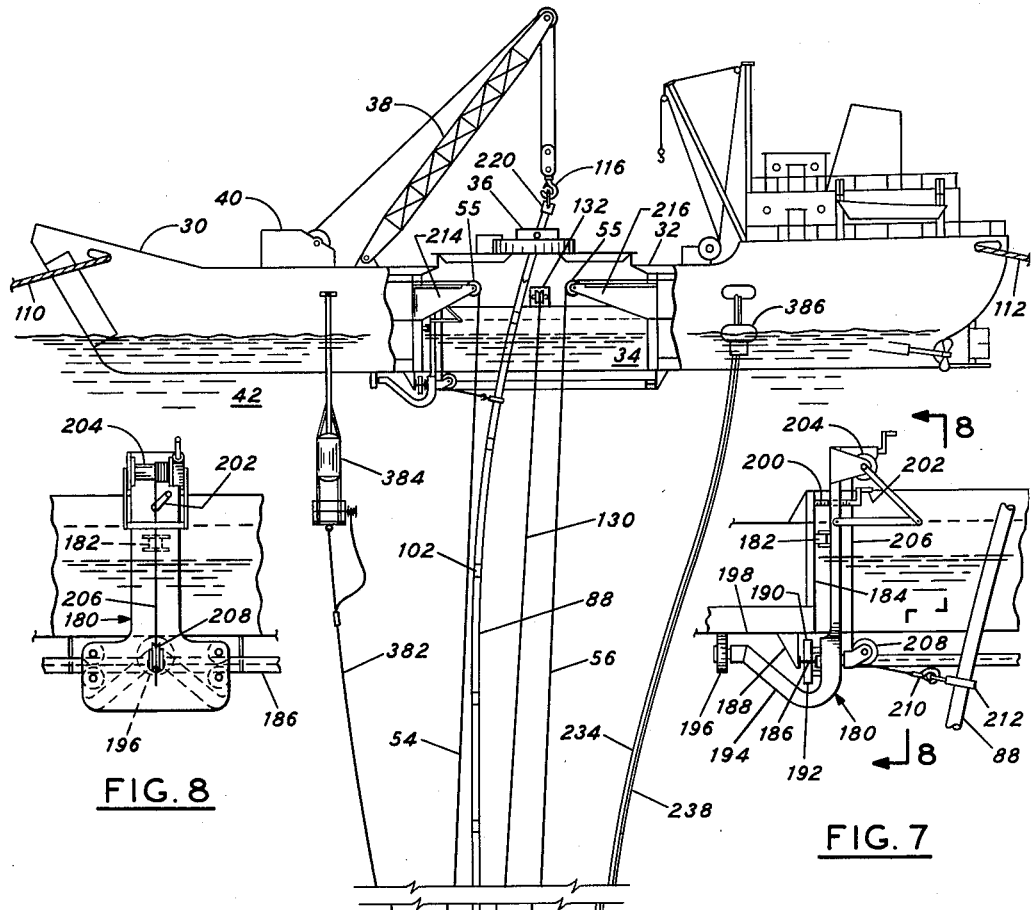
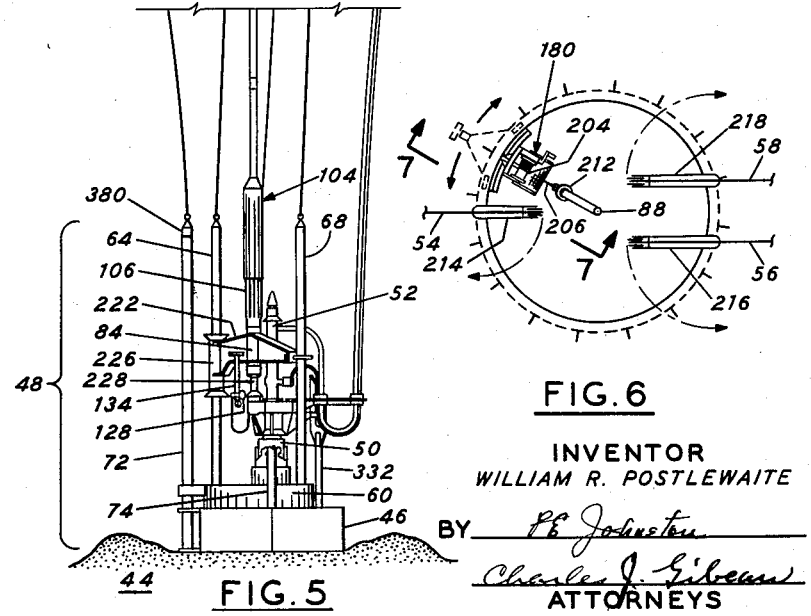
FIG. 8
FIG. 7
FIG. 6
FIG. 5
INVENTOR
WILLIAM R. POSTLEWAITE
BY ATTORNEYS

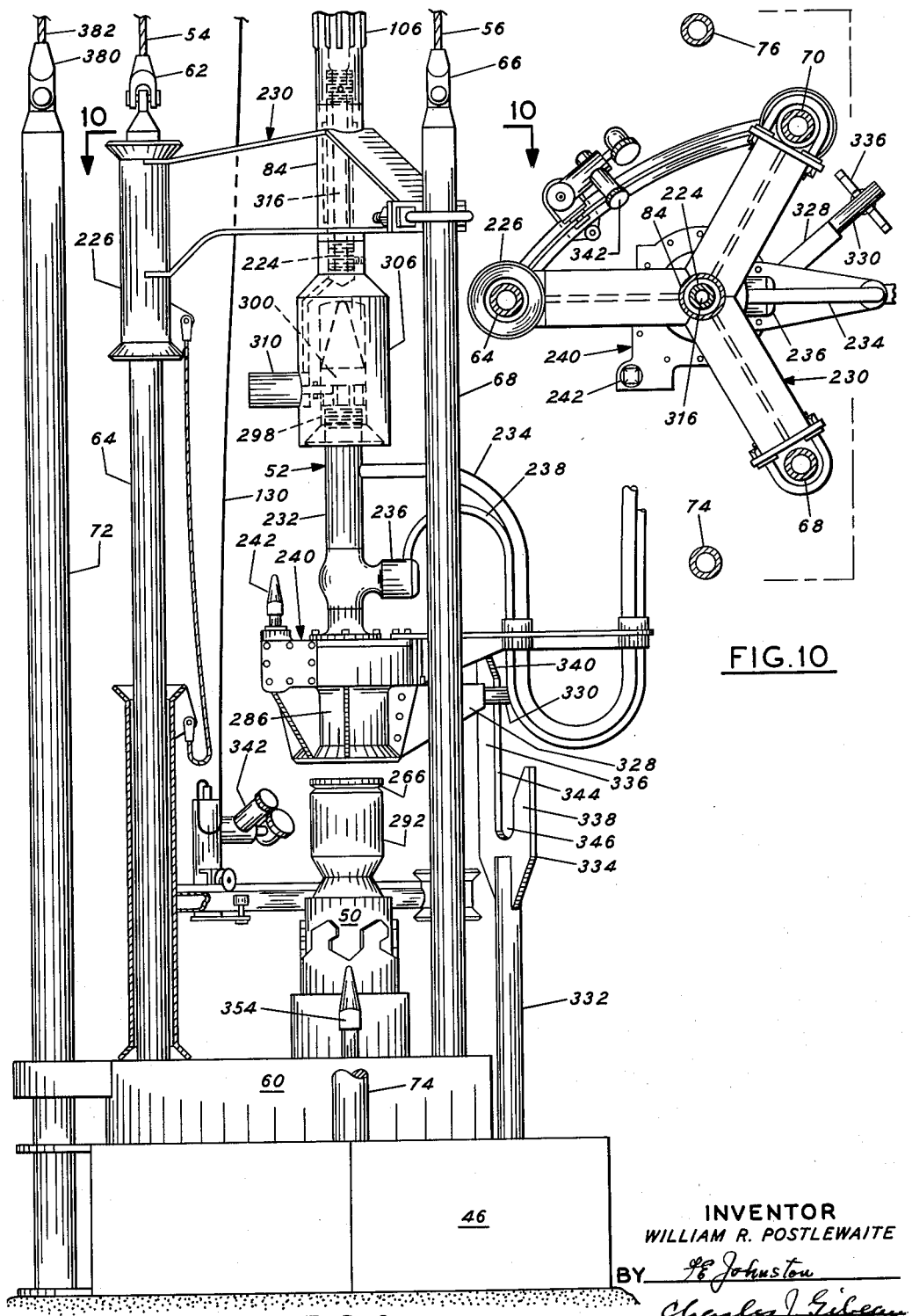

Dec. 28, 1965 W. R. POSTLEWAITE 3,225,826
METHOD AND APPARATUS FOR WORKING ON SUBMERGED WELLS
Filed Nov. 5, 1962 8 Sheets-Sheet 4

INVENTOR
WILLIAM R. POSTLEWAITE
BY
ATTORNEYS

Dec. 28, 1965  W. R. POSTLEWAITE  3,225,826
METHOD AND APPARATUS FOR WORKING ON SUBMERGED WELLS
Filed Nov. 5, 1962  8 Sheets-Sheet 6
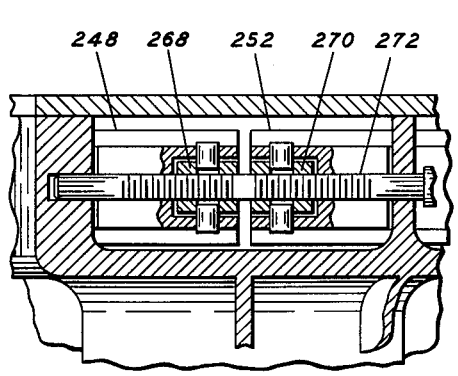
FIG.17
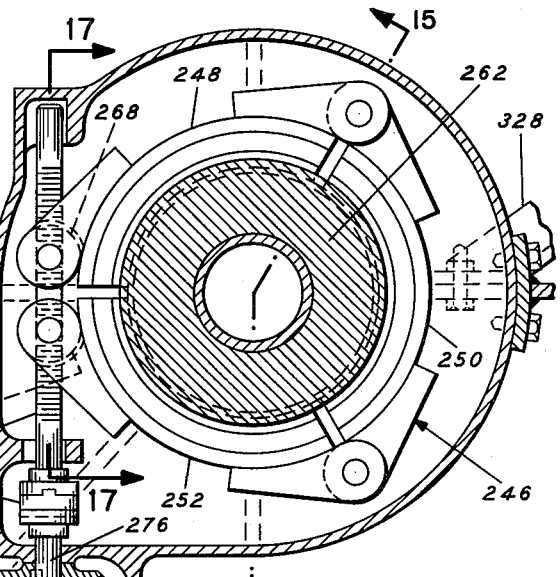
FIG.16
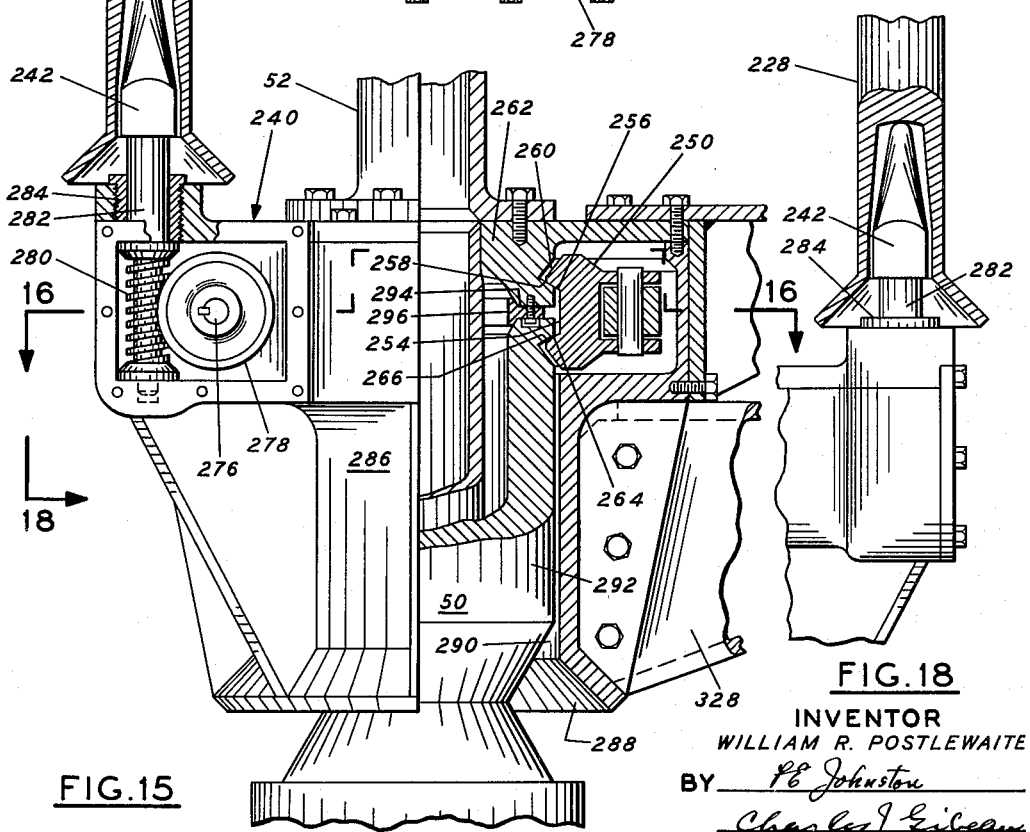
FIG.15
FIG.18
INVENTOR
WILLIAM R. POSTLEWAITE
BY P.E. Johnston
Charles J. Gibson
ATTORNEYS

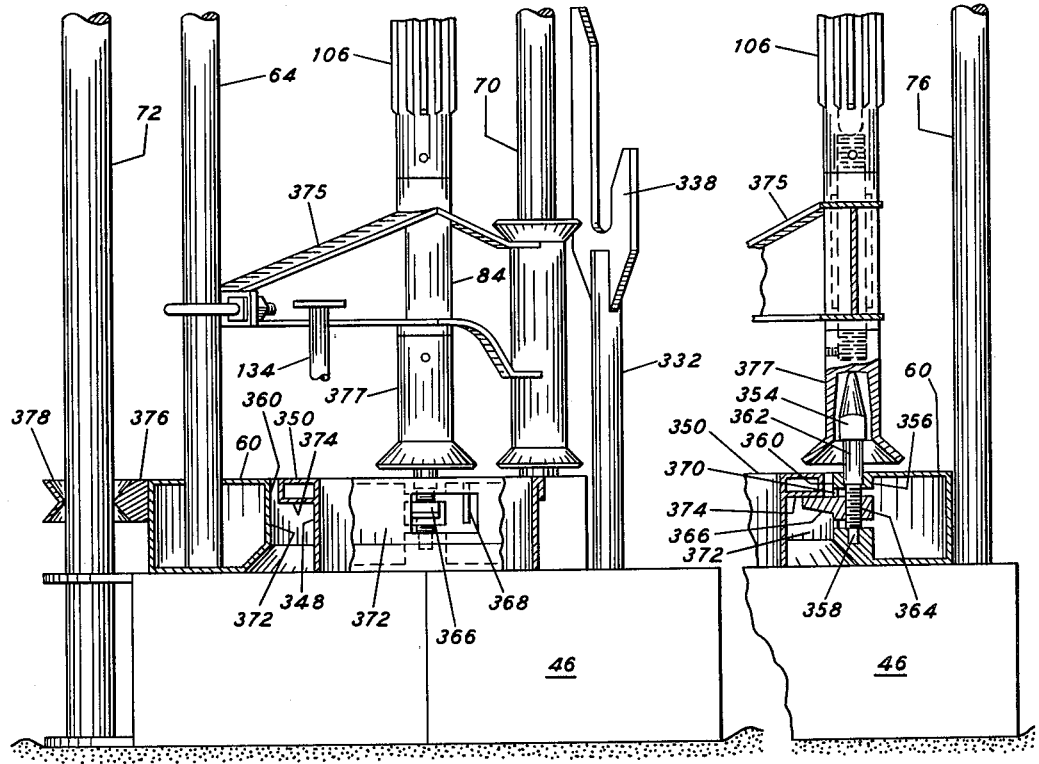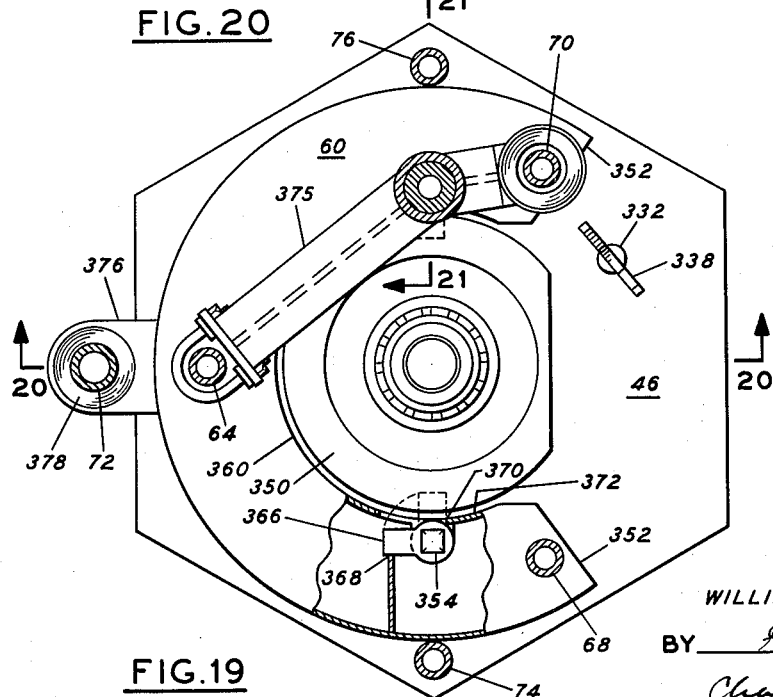

United States Patent Office 3,225,826
Patented Dec. 28, 1965

3,225,826
METHOD AND APPARATUS FOR WORKING ON SUBMERGED WELLS
William R. Postlewaite, Menlo Park, Calif., assignor to Chevron Research Company, a corporation of Delaware
Filed Nov. 5, 1962, Ser. No. 235,433
12 Claims. (Cl. 166—.6)

This invention relates to a method and apparatus for working on a submerged wellhead by operations performed from a platform at the surface of the water and more particularly to a method and means for securing wellhead apparatus at the opening of a submerged well bore to complete a sea bottom well without the aid of divers and to adjust and control the operation of such wellhead apparatus by remote operation from a platform floating on the surface of the water.

As the search for offshore oil progresses into deep waters, it becomes increasingly important that methods and equipment be devised which will permit offshore wells to be drilled and completed and placed on production, with all the operations, connections, and controls which are a necessary part of such work, with some means which does not require the use of divers and yet which can be done with the certainty and safety which is necessary in good oil field practice. If the oil under deep water is to be produced at an economically competitive cost, the cost of the means by which this oil is obtained must be kept reasonably in line with the cost of producing oil from sources in a less difficult environment. It is an object of this invention to provide a wellhead apparatus for submerged wells, which apparatus will be comparable to that used for onshore wells in certainty of operation and which will not require the use of numbers of expensive remotely operated control motors as a permanent part of such equipment.

The art of drilling in deep water has advanced to a stage where it does not appear that the depth of the water over an oil-bearing formation places a practical limitation on drilling such wells at a reasonable cost. However, there is still a need for methods and apparatus for completing and producing such a well, which apparatus will be certain in operation without the aid of divers, which will not be too costly to construct and install, and which will not present any undue difficulties or expense in the operation and maintenance of a commercially productive oil well. It is another object of this invention to provide methods and apparatus which meet these requirements.

A further object of this invention is to provide a novel method and apparatus for installing and operating submerged wellhead apparatus, including control equipment, from a platform at the surface of the water without the aid of divers.

Another object of this invention is to provide novel apparatus for use in working on the wellhead apparatus of a submerged well.

Other objects of this invention will become apparaent as the description of it proceeds hereinafter.

The objects of this invention are achieved by using wellhead apparatus, including wellhead control equipment, which is constructed so that various securing and controlling operations required to make it function properly can be accomplished by means of a tool which is lowered from the surface platform and guided into operating contact with the actuating unit of an operational portion of the assembly.

In a preferred embodiment of this invention, the operating tool comprises a rigid guide member which extends transversely across at least two guidelines which are connected between the surface platform and the submerged wellhead assembly. The rigid guide member is mounted on the guidelines in sliding relationship so that it can be run up and down along them. The bottom ends of the guidelines are secured to the tops of respective rigid vertical posts, the bottom portions of which can be connected to the wellhead asembly with each post having a definite known lateral orientation with respect to the wellhead apparatus.

The transversely disposed guide means has mounted on it an operator element which is rotatable about a vertical axis in a bearing fixed in transverse position on the guide member. This transverse position is selected to place the rotatable operator element in substantially vertical alignment with a selected one of the actuator units on a wellhead apparatus.

The actuator unit is made with a square exterior conformation in a lower portion of it and with a conical upwardly tapering exterior surface above the square portion, terminating at its upper end at the point of the cone. The rotatable operator element on the transversely disposed guide means is made with or has attached to it a portion which has an outwardly flared opening exposed below the transverse guide means. The flared opening leads to a recessed portion within the rotatable member and the recess has a squared configuration which is large enough to function as a socket to receive the squared portion of the actuator element.

A string of tubing, such as a string of drill pipe, is connected to the top end of the rotatable operator element after the latter is asembled on the transverse guide means and serves as the means for rotating this operator element in its bearing. Thus the operating tool comprises the rigid transverse guide member, the operator element rotatably mounted on it, and the string of tubing which projects upwardly to the surface platform.

The transverse guide member is placed across and in engagement with selected guidelines at the drilling platform and the lower end of the string of tubing is connected to the rotatable operator element. As the string of tubing is made up on the platform, the transverse guide member is lowered along the guidelines until it reaches and is guided over the rigid vertical posts at the wellhead assembly. The rigid posts guide the operator element into substantially vertical alignment with the selected actuator unit on the wellhead assembly, and the conical shape of the latter in conjunction with the flared opening of the rotatable member will, upon further lowering of the drill string, cause these parts to become engaged in operating relationship. When this condition is achieved, the upper portion of the drill string is rotated at the surface platform the amountd and direction required to accomplish the desired connection or adjustment to the submerged wellhead apparatus. The drill pipe is then raised to the surface platform, pulling upwardly with it the transverse guide member and the rotatable socket which is mounted on it.

If now an adjustment is to be made to another portion of the submerged wellhead apparatus, a second transverse guide member is selected on which is mounted a rotatable operator element which is positioned in conjunction with particular guidelines, to be in alignment with the actuator unit of this other portion. This second guide member is mounted on the selected guide cables at the drilling platform, the string of drill pipe is connected to it, and the procedure described heretofore is repeated.

This invention comprehends the use of a transverse guide member which has a remotely controlled motor means mounted on it and which is connected to the rotatable operator element as a means for turning the latter rather than using a string of tubing for this purpose.

This invention also comprehends the use of a string of tubing or drill pipe as a hydraulic conduit which can be used to convey a hydraulic fluid under pressure from the surface platform through a hydraulic coupling, which is made up between mating parts on the transverse guide member and on the complementary actuator unit on the wellhead apparatus, and thence to appropriately constructed fluid-pressure-operated actuating means in the wellhead apparatus.

Preferably in these operations a submersible television camera will be sent down with the tool, or otherwise disposed at the wellhead apparatus to enable the operation at the wellhead to be observed from the surface.

The specification, together with the accompanying drawings, which form part of it, describes the method and several modifications of apparatus for accomplishing the objects of this invention.

With reference to the drawings:

FIG. 5 illustrates in side elevation, with portions broken away for clarity, a modification of the assemblage of apparatus made in accordance with this invention and, similarly to FIG. 1, shows the wellhead control equipment being clamped onto the well opening.

FIG. 6 is a schematic illustration in plan view of the arrangement of the apparatus in the trunk of the drilling vessel, as used in the assembly of FIG. 5.

FIG. 7 is a schematic illustration in side elevation of the mechanism, used in the trunk of the vessel, for placing a transverse force on the top portion of the string of drill pipe, taken along the line 7—7 of FIG. 6.

FIG. 8 is a schematic illustration in elevation of the device of FIG. 7, taken along the line 8—8 thereof.

FIG. 9 represents in side elevation an illustration of the disposition of portions of the submerged wellhead apparatus as wellhead control equipment is being lowered into engagement with the opening of a submerged well bore.

FIG. 10 represents a plan view of a portion of the apparatus taken along the line 10—10 of FIG. 9.

FIG. 15 illustrates in side elevation and partly in section details of a clamp structure by which the wellhead control equipment is secured to the casing at the submerged well opening, taken along the line 15—15 of FIG. 16.

FIG. 16 represents a plan view of the clamp structure taken along the line 16—16 of FIG. 15.

FIG. 17 illustrates in side elevation and partly in section a detail of a portion of the operating means of the clamp structure.

FIG. 18 illustrates in side elevation and partly in section another view of the relationship between the rotary operator element and the actuator unit for the clamp structure when the latter is being clamped to or unclamped from the well opening.

FIG. 19 illustrates in plan view and partly in section the disposition of the apparatus when the operating tool is being used to operate the actuating unit of the device by which the guidelines and guide posts are secured to the fixed portions of the underwater wellhead apparatus.

FIG. 20 illustrates in side elevation and partly in section a portion of the apparatus taken along the line 20—20 in FIG. 19.

FIG. 21 illustrates in side elevation and partly in section further details of the wellhead apparatus taken along the lines 21—21 of FIG. 19.

Figures 1, 2, 3, 4:
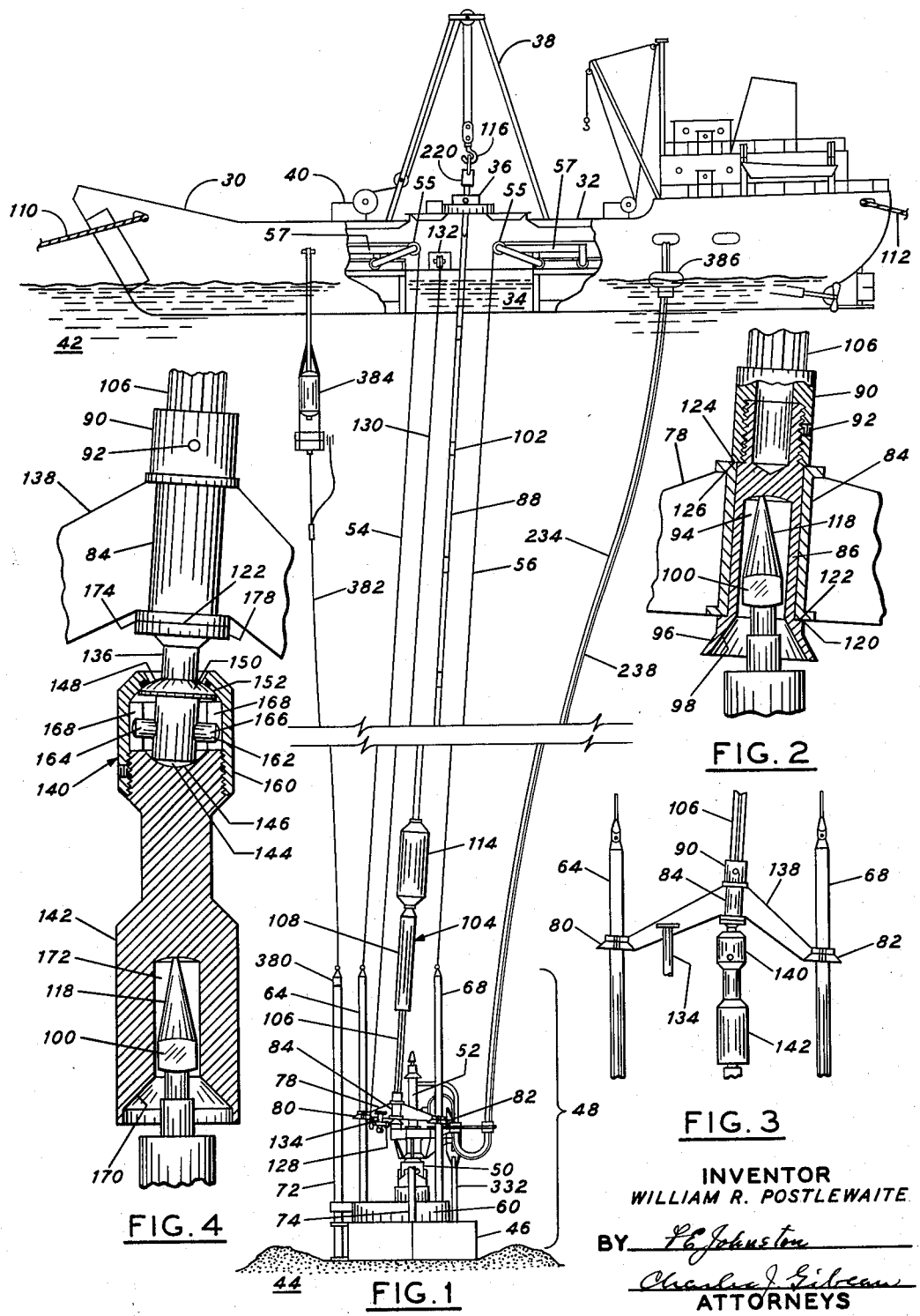
FIG. 1 illustrates in side elevation, with parts broken away for clarity of presentation, apparatus assembled in accordance with this invention being used to secure wellhead control equipment to the casing at the opening of a submerged well bore.
FIG. 2 illustrates in side elevation and partly in section the construction and relationship of the connection between a rotatable operator element and an actuator unit by which an adjustment is made to a portion of the submerged wellhead apparatus by a string of tubing which is rotated at the surface platform.
FIG. 3 illustrates schematically in side elevation a modification of a portion of the assemblage of this invention, particularly with respect to a modification of the rotatable operator element carried by the transverse guide means.
FIG. 4 illustrates in side elevation and partly section a portion of the modification of FIG. 3 in greater detail.

Referring to the drawings and particularly to FIG. 1, there is illustrated a vessel 30 which is constructed with a working platform 32, a central trunk 34, and contains a gimbal-mounted rotary table 36, derrick 38, draw works 40, and all the other equipment and appurtenances required for drilling and working on a submerged well, which arrangement is familiar to the art. The vessel has been anchored on the surface of a body of water 42 above the site where a well has been drilled into the underwater bottom 44. Fixed base member 46, which forms part of the submerged wellhead apparatus 48, has been secured to casing which is cemented in the well bore. The upper end of the well casing terminates in a fitting 50 which projects above the fixed base member and to which the wellhead control equipment 52 is to be secured. It is assumed for the purpose of the present description that the submerged well has been drilled, cased, and completed to the stage where it is ready to have the wellhead control equipment secured to the well opening, and the pipelines connected for producing oil from the well.

For simplicity of description, although not necessarily for the proper operation of this invention, it will be assumed that the submerged well was drilled using flexible guidelines to connect the drilling vessel with the submerged wellhead apparatus to guide drilling equipment into the well bore, for setting casing and tubing in the well, and for guiding to the submerged well such other tools as were required to work on it. It will be assumed further that the guidelines used were the three guidelines 54, 56, and 58, FIGS. 1 and 6, which are placed over respective sheaves 55 mounted at the ends of adjustably retractable carriages 57 to support the upper ends of the lines in the trunk of the vessel, and that these guidelines remain secured to the submerged wellhead structure to be used for the purpose of the present invention. It may be noted, however, that methods for drilling and setting the casing in an offshore well from a surface platform without the use of guidelines are known to the art and it is within the concept of this invention that such guidelines as are desirable in its operation may be secured between a submerged wellhead structure and the surface platform after the well has been drilled and after the initial well completion steps have been performed.

Each guideline is secured at its lower end to the topmost portion of a complementary rigid guide post which is securely affixed to an auxiliary base 60, which base is securely but detachably connected to the fixed base 46. Thus the guideline 54 is secured by the flexible connector 62, FIG. 9, to the top of rigid guide post 64, and similarly the guideline 56 is secured by the flexible connector 66 to the top of the rigid guide post 68, while the third guideline is secured in a like manner to the top of the rigid guide post 70 shown in section in FIG. 10.

Thus in this embodiment of the invention the rigid guide posts and the flexible guidelines are each a part of a guide means connecting the submerged wellhead apparatus with the vessel.

The rigid guide posts 64, 68, and 70 are fixed in vertical parallel alignment with each other, and as the auxiliary base 60 to which they are affixed is set onto the fixed base 46, the auxiliary base is brought into a precise alignment with relation to the fixed base by means of the rigid positioning posts 72, 74, and 76, FIG. 19, in a manner described in more detail hereinafter. When the auxiliary base is connected to the fixed base, the guide posts 64, 68, and 70 will be laterally and angularly oriented in relation to the fixed base 46 and to the wellhead in a definite predetermined position. It will, however, be apparent that the particular base structure including the arrangement of the guide posts discussed heretofore is not necessary for the purpose of the present invention, but that the novel effects of it can be achieved with other arrangements and specific constructions of guide means between the surface platform and the submerged wellhead, provided such other guide means are adaptable to accurately positioning at the submerged wellhead the operating tool to be described hereinafter.

Referring again to FIG. 1, the operating tool comprises in one embodiment a transverse rigid guide member 78 which is mounted across and slidably engages at least two guidelines, as 54 and 56, and can slide over and be guided by the corresponding rigid guide posts 64 and 68. For this purpose, the transverse guide member has at each of its extremities a guide collar, 80 and 82 respectively, which for convenience in assembling the guide member on the guidelines may be made of half sections which can be bolted or clamped together, as indicated schematically in FIGS. 1 and 3, or are otherwise constructed to be quickly assembled on and removed from the guidelines.

The transverse guide member has mounted on it a vertically disposed journal bearing 84 which is fixed in transverse position on the guide member to be in substantially vertical alignment with a particular selected portion of the submerged wellhead apparatus when the transverse guide member is guided onto the rigid guide posts at the bottoms of the guidelines.

A rotatable element 86, FIG. 2, is journaled in the bearing 84 for rotation about its vertical axis, and means are provided for connecting the lower end of a string of drill pipe 88 to the upper end of this rotatable element, as indicated by the screw-threaded connection 90. A set screw 92 may be used in the connection to prevent it from becoming disengaged by a reverse rotation of the string of drill pipe.

In the modification of the invention illustrated in FIG. 2, the rotatable element 86 has an axially disposed recess 94 formed in it and open at the bottom end of the element. The opening is surrounded by an outwardly flared skirt 96, the inner wall 98 of which forms a funnel leading into the recess. The recess has a square configuration in cross section and forms a socket to receive a complementary squared actuating unit 100, which actuating unit is operably connected to a particular one of the connector or control means on the wellhead apparatus, as will be described more fully hereinafter.

The string of drill pipe 88 is made up aboard the vessel 30 and is used to lower the transverse guide member 78 from the vessel along the flexible guidelines and to the submerged wellhead structure. Thus finally the string of drill pipe extends from the rotary element 86 to the surface platform when the socket recess 94 surrounds the complementary actuator element 100. Preferably the string of drill pipe is made up with connections 102 which will permit the string to be rotated in either direction without unscrewing or disengaging one of the connections between its sections, and for this purpose a type of safety joint known to the art may conveniently be used.

In order to remove the effects of the heaving and rolling vessel from disengaging the socket recess 94 from its mating position on the actuator unit 100, a telescoping section 104 is placed in the string of drill pipe, preferably immediately above the rotary element 86 on the rigid transverse guide member. As will be understood in the art, this telescoping section, which may be a bumper sub, employs an inner member 106 which is movable longitudinally into and out of an outer member 108, and longitudinally disposed interengaging splines are placed between the members to prevent relative rotation between them while permitting the relative longitudinal movement. By placing the bumper sub in this position and by taking care that the telescoping inner member 106 is at least partially extended out of the complementary outer member 108 when the socket is engaged with an actuating unit, the weight of the principal portion of the string 88 and any appurtenances attached to it will not bear on the rigid transverse guide member 78. Hence the weight of the parts of the tool bearing on an eccentrically disposed actuator unit 100 of the wellhead apparatus will be known, and the strength of the submerged apparatus can be designed accordingly without danger of its becoming damaged by imposing undue loads on it.

As stated heretofore, the floating vessel is anchored over the well site. Although the anchor lines as represented by the anchor lines 110 and 112, FIG. 1, will keep the vessel in the environment of its anchored position, nevertheless it is common experience that such an anchored vessel will move laterally on the surface of the water to some degree, depending on the amount and direction of the wind and water forces acting on it. Rather than try to anchor such a vessel in a statically fixed position vertically over the well bore while the submerged wellhead apparatus is being worked on, the apparatus of this invention is devised to be operable for its intended purpose when the surface platform is directly above the wellhead equipment or displaced from the vertical position in any direction within reasonable limits.

One means for achieving this result is illustrated in FIG. 1. In this embodiment of the invention a relatively massive weight 114 is connected in the lower end of the string of drill pipe, preferably immediately above the bumper sub described heretofore. The weight 114 in conjunction with the weight of the shell 108 of the bumper sub pulls the string of drill pipe taut against the hook 116 by which it is connected to the derrick 38 on the vessel and substantially removes any bends which otherwise would occur in the string of pipe due to the transverse water forces acting on it or due to the distributed weight of the string of drill pipe. Particularly, this arrangement of the apparatus will reduce or prevent curvature in the lower portion of the string which otherwise would increase the angle with which the string approaches the wellhead apparatus.

The position of the vessel relative to a vertical extension of the well bore can be determined by instruments which are known to the art. Thus, with the lateral displacement of the vessel from the vertical position known and with the depth of the water known, since the string of drill pipe extends as a substantially straight line between the vessel and the submerged wellhead apparatus, however with some determinable curvature of the string due to the weight of the drill pipe, the bottom portion of the angle which the string of pipe makes with the vertical when the rigid transverse guide member 78 is at the submerged wellhead can be determined. This, of course, will also be the angle of the socket member with respect to the actuator element to be engaged by it, and these two members are designed in form and transverse dimension so that the actuator element will seat within the socket of the tool when the latter approaches an actuator element within predetermined angular displacements of the tool from the vertical.

It will be noted particularly that in the arrangement illustrated in FIG. 2, only the skirt portion 96 of the rotary element 86 projects below the transverse guide member 78, and the recess 94 in the rotary element is disposed on the longitudinal axis of the transverse guide member. This arrangement reduces the displacement of the opening 98 of the socket from alignment with the top of the actuator unit when the transverse guide member is tilted angularly on the guide posts.

The squared configuration in cross section of the interengaging parts of the socket and the actuator element permits them to be made with a looseness of fit which will accommodate the angular displacement of the parts from a colinear position and still maintain a rotary driving connection between them. Other configurations than the square cross section described heretofore also will accomplish this result, and some such other configurations will be described hereinafter.

It may be noted, again by reference to the embodiment illustrated in FIG. 2, that the upper end of the actuator element 100 is tapered in a conical form 118 with the apex of the cone uppermost. This conical form will co-operate with the funnel opening 98 of the rotary element 86 to aid the socket to be guided over and to seat over an actuator element as the tool is lowered onto the submerged wellhead apparatus.

For this embodiment of the invention, an individual rigid transverse guide member, corresponding to the member 78, is made for each of the actuator elements to be operated by the tool. Each of the different transverse guide members has a journal bearing corresponding to that of the journal bearing 84 mounted on it in a position to place the socket of the rotary element 86 in substantially vertical alignment with the particular actuator element to be operated. In this circumstance, each of the journal bearings in the different rigid transverse guide members can be of the same size so that each may receive the same rotary element 86 in proper operating relationship. Thus, when it is desired to operate on a particular actuator element on the submerged wellhead apparatus, the rotary element 86 can be seated in the journal bearing of the particular rigid transverse guide member constructed for that actuator element. It will be noted that the rotary element has a radially disposed shoulder 120 which bears against a complementary radially disposed lower surface 122 on the journal bearing structure, and the mating surfaces act as a thrust bearing to receive the load of the transverse guide member 78 on the portions of the tool which rest on the tip of the actuator element when the latter is being operated upon. The lowermost portion of the coupling member 90 also is made with a radially disposed shoulder 124 which co-operates with a similarly radially disposed upper surface 126 of the journal bearing structure to maintain the rotary element positioned in the journal bearing when the parts are assembled together and permits the rotary element to be removed from the journal bearing when the parts are disassembled.

In order to observe the approach of the operator element to a complementary actuator unit, and to be sure the components are properly engaged before applying torque to the string of drill pipe, a submersible television camera 128, FIG. 1, together with appropriate lights, may be demountably secured to the transverse guide member 78 and is remotely adjustable in position to place the lower end of the operator element and the approaching upper end of the actuator unit in the field of view. The camera is energized, and the signals from it transmitted through the cable bundle 130 extending from a winch 132 on the surface platform. Each transverse guide means carries a mount 134 for the camera, to which the latter is attached when a particular transverse guide member is selected for use.

FIGS. 3 and 4 illustrate another embodiment of the socket portion of the tool in accordance with this invention. In the embodiment described heretofore, the tool was designed to permit the socket portion to approach and seat over an actuator element when the two members were not in angular alignment. In accordance with the present embodiment, the socket portion of the tool automatically is placed in vertical alignment with an actuator element even though the drilling vessel may be laterally displaced from above the well bore and even though the string of drill pipe extends downwardly to the submerged wellhead apparatus at an angle to the vertical.

As illustrated in detail in FIG. 4 a rotary element 136 is journaled in a transverse rigid guide member 138 and with its lower end projecting downwardly below the guide member and terminating in or having attached to it one portion of a universal joint 140. The mating portion of the universal joint is connected to the socket element 142, and the weight of the latter causes it to assume a vertical position even though the string of drill pipe and the attached rotary element may be disposed at an angle to the vertical.

In the particular construction illustrated, the lowermost end of the rotary element 136 is formed with a spherical surface 144 which mates with a complementary spherical surface 146 formed in the top end of the socket portion 142. A radially extending collar 148 is secured to the shaft of the rotary element in a position spaced above its spherical lower end. The collar is formed with the spherical upper surface 150 and is engaged by a complementary spherical surface 152 on a cap 160 which is screwed onto the upper end portion of the socket member. A transverse pin 162 is secured in the shaft of the rotary element with the ends 164 and 166 of the pin projecting radially beyond the circumferential surface of the shaft. The cap 160 is formed wth unitary radially inwardly projecting fins 168 which are disposed on each side of each of the projecting respective ends of the pin. Thus when the rotary element is rotated by a string of drill pipe the socket member 142 also is rotated through the interengagement of the pin 162 with the fins 168 while the mating spherical surfaces described heretofore permit the socket member to be displaced angularly relative to the rotary element.

The lowermost end of the socket member is formed with a funnel-shaped opening 170 which leads to the recessed interior portion 172. As in the embodiment described heretofore, this recess may be made with a square configuration in cross section to engage a squared portion of an actuator unit 100 in rotary driving relationship. A thrust bearing surface is formed between the lower surface 122 of the journal bearing structure 84 on the transverse guide member 138 and the upper surface 174 of a radially projecting flange 176 formed on the shaft of the rotary element for the axial loads imposed on the rotary element by the weight of guide member 138 when the lower portion of the tool rests on the tip of the actuator unit.

Preferably a splined telescoping connection is placed in the string of drill pipe immediately above the transverse guide member 138, as indicated in FIG. 3, to reduce to a minimum the vertical loads imposed on the actuator element.

The journal bearing 84 is mounted on the transverse guide member 138 in a position to cause the lower end of the socket member 142 to be in substantially vertical alignment with a particular actuator unit when the tool is guided downwardly from the drilling vessel to the submerged wellhead apparatus. In this modification of the invention the guide member 138 is formed to place the guide collars 80 and 82 in alignment with the center of rotation of the universal joint 140. The conical shape 118 of the tip of the actuator unit in conjunction with a funnel-shaped opening 170 of the socket member, together with the looseness of fit between the actuator unit and the socket, permits the socket to seat over and engage the actuator unit even though there is some misalignment of the parts.

As described heretofore, a particular transverse guide member is made to properly guide the socket end of the operating tool into vertical alignment with each of the differently placed actuator units on the wellhead apparatus using selected pairs of the guidelines 54, 56, and 58, or in some cases all three guidelines, for this purpose.

FIG. 5 illustrates another arrangement of apparatus assembled in accordance with the present invention. In the embodiment described heretofore, a vertical and angular misalignment of the operating tool with an actuator unit was compensated for by the manner of weighting the lower end of the string of drill pipe and by the construction and arrangement of the socket portion of the tool. In the embodiment about to be described, the principal portion of the misalignment of the operating tool with the submerged wellhead apparatus is compensated for by placing a lateral force on the string of drill pipe near its upper end to cause the upper portion of the string to be curved toward the wellhead apparatus so that the lower portion of the string will be more nearly in vertical alignment with the well, and the lateral force which otherwise would occur between the transverse guide member and the guide posts will be appreciably reduced.

To accomplish these objectives, a mechanism 180, FIG. 6, for exerting a lateral pull on the upper portion of the string of drill pipe is mounted in the circular trunk 34 of the drilling vessel. A roller 182, FIG. 7, mounted on the mechanism bears against and rolls on an upper portion of the cylindrical wall 184 of the trunk. A circular track 186 is affixed to the vessel in concentric relationship with the trunk 32, as by the brackets 188, and this track is engaged by pairs of upper 190 and lower 192 rollers which are mounted on the lower portion of the mechanism 180. A radially extending arm 194 projects from the lower portion of the mechanism, and the end of it supports a roller 196 which bears against a planar lower surface 198 on the vessel. This arrangement of rollers supports the weight of the mechanism on the circular track 186 and also maintains it in an upright position within the trunk of the drilling vessel while permitting the mechanism to be moved around the inner periphery of the trunk throughout the full circumference thereof. A locking means, illustrated by the screw-threaded shaft 200 which can be operated by the crank 202 to engage with or be disengaged from the inner peripheral wall of the trunk permits the mechanism to be locked in a stationary manner at a desired position along the wall of the trunk.

The mechanism 180 carries a winch 204 on which a line 206 is wound which passes through a pivotally mounted sheave 208 on the lower portion of the mechanism so that the free end of the line can be connected by the hook 210 to a collar 212 which is placed on the upper end portion of the string of drill pipe for this purpose. Preferably the supports 214, 216, and 218 for the guidelines in the trunk 34 are hinged structures which can be swung clear of the trunk to provide the clearance for the circumferential movement of the mechanism 180. Alternatively the mechanism 180 may be disengaged from the walls of the trunk, lifted around the guide lines, and re-engaged at the approximate desired circumferential location.

The upper end of the string of drill pipe is supported from the derrick 38 by the hook 116 and swivel 220 in a well-known manner. The string of pipe passes through a gimbal-mounted rotary table 36 on the drilling deck where the sections of pipe are joined together to make the string, as will be understood in the art. Preferably, as mentioned heretofore, the sections of pipe are connected together by couplings 102 which will permit the string to be rotated in either direction without the sections becoming disengaged from each other.

In the modification of the invention illustrated in FIG. 5, the amount and direction of lateral displacement of the anchored vessel from a vertical position over the submerged wellhead apparatus is determined prior to the time the transverse guide member 222 is placed across the guidelines, and thus prior to the time the string of drill pipe is made up, and the mechanism 180 is moved to an appropriate position in the trunk of the vessel. Since the guidelines can be slack at this time, they and their support brackets can be handled to clear the trunk if necessary for the movement of the mechanism 180. The guidelines are then mounted on their supporting sheaves 55 on the bracket structures and connected to appropriate winches or counterweights to pull them taut. The transverse guide member 222 is then placed across and slidably mounted on selected guidelines, as the lines 54 and 56, in the manner explained heretofore with reference to the embodiment shown in FIG. 1.

A telescoping splined sub 104 is connected to the top of a rotary element 224 (FIG. 13) journaled on the transverse guide member 222 in a manner described in detail heretofore, and the lower end of the string of drill pipe 88 is connected to the top end of the splined sub. The transverse guide member 222 is lowered along the guidelines as the string of drill pipe is made up on the drilling platform until the guide member approaches a position adjacent the tops of the rigid guide posts 64 and 68. At this time the amount and direction of lateral displacement of the vessel from the vertical above the submerged wellhead apparatus is again checked, the mechanism 180 is moved to a corresponding position along the wall of the trunk 34, and the line 206 is connected to the collar 212. The winch 204 on the mechanism is operated to place a lateral force on the upper portion of the string of drill pipe to cause the latter to curve toward the submerged wellhead apparatus to thereby compensate for the lateral displacement of the vessel. The position of the collar 212 on the string of drill pipe and the force applied to the line 206 to which it is connected will determine the amount of this curvature.

The lower portion of the string of drill pipe below the curved upper portion will hang substantially vertically unless the lateral displacement of the drilling vessel is too great to be compensated for by this method. To assist the lower portion of the string to hang straight, it is sometimes desirable to hang a weight on the lower end of it. This may be done by making the bumper sub 104 with a thick outer shell 108, by adding drill collars to the lower end of the drill string, or by the use of weights as described with respect to the embodiment shown in FIG. 1, depending upon the amount of weight required to achieve this purpose.

In the present embodiment of the invention, since the curvature which otherwise would occur at the lower end of the string of drill pipe due to the lateral displacement of the drilling vessel is now made to occur in the upper portion of the string, there is little or no transverse force acting on the transverse guide member 222 as it approaches the rigid guide posts 64 and 68, and it can seat over the guide posts and move toward an actuator element 100 in substantially vertical alignment with the latter. Preferably, at least one guide collar 226 on one end of the transverse guide member 222 is made long enough to remove any residual tilt of the transverse guide member as it moves on to the rigid guide posts to thereby prevent any appreciable angular displacement from vertical alignment of the socket end of the operating tool as the socket is lowered onto an actuator unit.

Figures 13, 14:
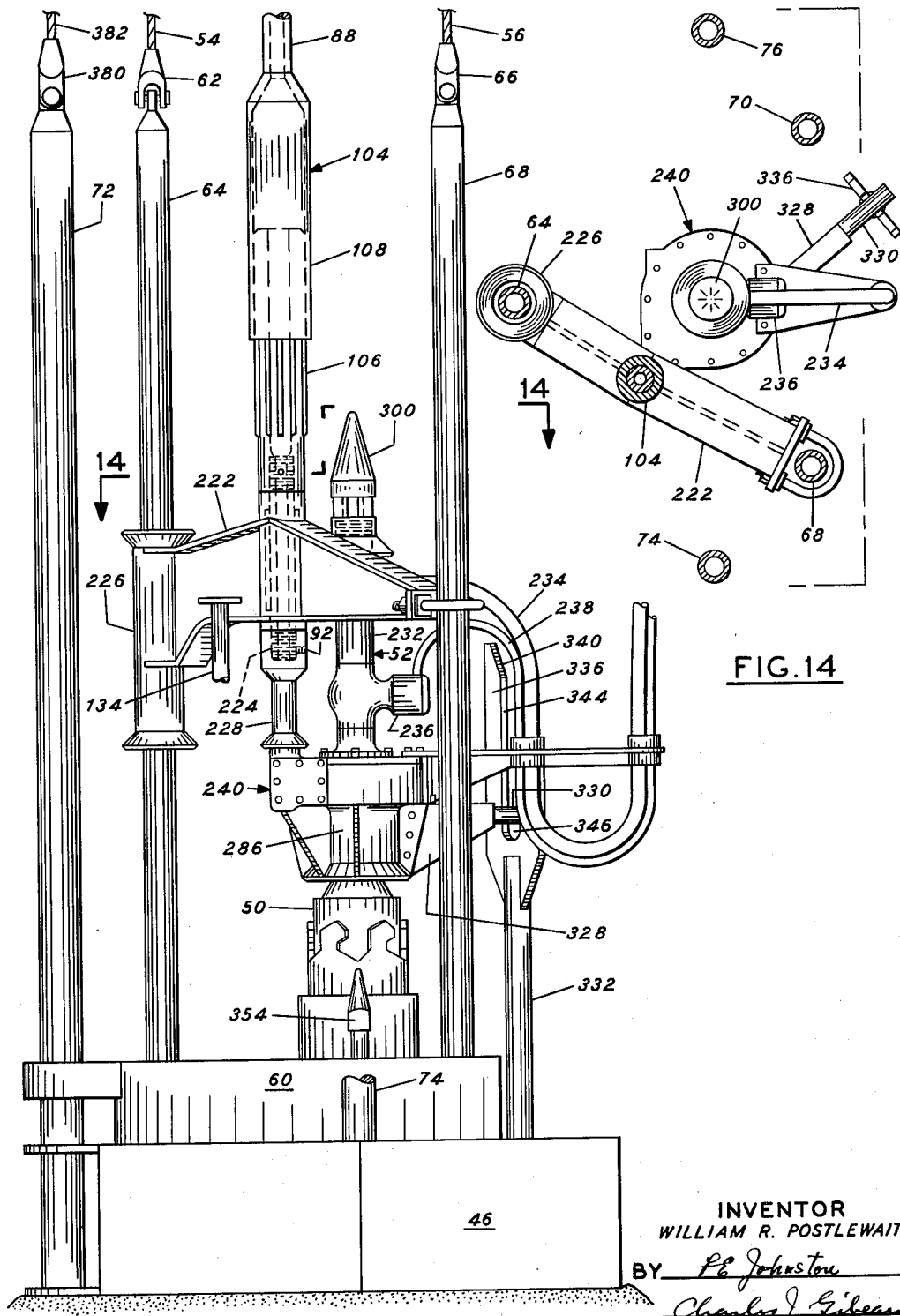
FIG. 13 illustrates in side elevation the disposition of portions of the apparatus while the wellhead control equipment is being secured to the well opening and shows the guided rotary operator element being used for this purpose.
FIG. 14 is a plan view of portions of the apparatus taken along the line 14—14 of FIG. 13.

The operator element 228, shown more clearly in FIG. 13, is similar in construction and function to the comparable elements described heretofore. As illustrated, this element is screwed onto the lower end of the rotary element 224, and the connection is locked together by means of a set screw 92. When the string of drill pipe is rotated at the surface platform, the rotary drive passes through the splined telescoping sub 104 and through the rotary element 224 to drive the operator eelment 228 and thus turn the actuator unit 100 with which the socket of the operator element is engaged.

FIGS. 9 to 13 illustrate the method and apparatus used for lowering wellhead control equipment from a surface platform and securing it to the casing of a submerged well opening. As illustrated in FIG. 10, the transverse guide member 230 used for this purpose preferably extends toward and engages in sliding relationship each of the three guidelines 54, 56, and 58 and subsequently is guided over each of the three rigid guide posts 64, 68, and 70. The guide posts are disposed symmetrically around the well opening, and at this time no components which will interfere with the use of the three-armed transverse guide member are connected to the underwater apparatus.

The specific internal construction of the wellhead control equipment is not a part of, nor is it necessary to, the proper operation of this invention. This equipment is schematically represented in FIG. 9 as comprising a cylindrical member 232 to which is connected the end of a pipeline 234 through which the well is produced and a hydraulically operated valve 236 to which the end of a hydraulic control line 238 is connected and through which the valve may be operated to control the flow from the well.

The upper portion 240 of a coupling is securely fastened to the lower end of the wellhead control equipment, and an actuator element 242 is provided for operating this portion of the coupling to clamp the wellhead control equipment to and unclamp it from the fitting 50 through which the tubing in the well is placed in communication with the wellhead control equipment.

Details of the construction and manner of operation of the coupling for securing the wellhead control equipment to the well opening are illustrated in FIGS. 15 to 18. The features of this coupling, except for the modifications made to it to adapt it for use in the present invention are known to the art. Briefly, the coupling comprises a clamp member 246 made of three pivotally connected sections 248, 250, and 252 which is located at and surrounds the jointure between two cylindrical members it is desired to clamp together in fluid-tight relationship. The inner circumferential surface of the clamp has a channel 254 recessed in it, the side walls of which taper outwardly from each other. These tapered surfaces are made to engage in close contact mating tapered surfaces which project radially inwardly from the circumferential walls of the respective end portions of the components to be coupled together. Thus the tapered surface 256 of the clamp member is made to engage a complementary tapered surface 258 of the recess 260 in the circumferential wall of the coupling component 262, and the other tapered surface 264 of the clamp member is formed to engage the complementary tapered surface 266 formed in a recess of the circumferential wall of the fitting 50. The free ends of the clamp segments 248 and 252 have trunnion nuts 268 and 270, respectively, pivotally mounted on them, one of the nuts having a left-hand thread and the other one a right-hand thread. The shaft 272 which has threads cut on its complementary to those of the respective nuts 268 and 270 is threaded through the latter, and the shaft is restrained from movement in a longitudinal direction. Thus when the shaft is turned in one direction, the clamp segments will spread apart, and when the shaft is turned in the opposite direction, the clamp segments will close together.

For the purpose of this invention, the shaft 272 is connected through a flexible coupling 274 to a stub shaft 276 which has a worm gear 278 keyed to it. The worm gear meshes with a worm 280 which is connected by the shaft 282 through a fluid-tight bearing 284 to the actuator unit 242. The parts are constructed so that the actuator unit will point vertically upwardly when the coupling is assembled on the lower end of the wellhead control equipment and is radially spaced apart from other portions of the apparatus to provide sufficient space around it to accommodate the socket end of the operating tool which is lowered onto it from the surface platform.

Also, for the purpose of this invention, the upper half 240 of the coupling has depending from it a webbed, strengthened skirt portion 286, the lower end of which is flared outwardly to form an inner funnel 288 which leads to a cylindrical inner chamber 290. The latter is dimensioned to fit closely around the cylindrical exterior surface 292 of the fitting 50. This skirt portion functions as a means to guide the upper half of the coupling over the fitting and to bring the parts into coaxial alignment.

The lowermost radial face 294 of the coupling portion 262 has affixed to it a packing element 296, which preferably is a steel ring, and which is designed to engage the uppermost radial surface of the lower portion of the coupling element, which in this case is the fitting 50, to form a fluid-tight seal between these members when they clamp together. The clamping action is accomplished by rotating the actuator unit 242 to rotate the shaft 272 in a direction to cause the clamped segments to approach each other and to apply force on the mating tapered surfaces formed in the upper and lower portions of the body of the coupler. The angle of taper is such that the upper and lower portions of the coupler will be forced toward each other, pressing the packing ring 296 between them and achieving a fluid-tight seal of great strength.

Figure 11:
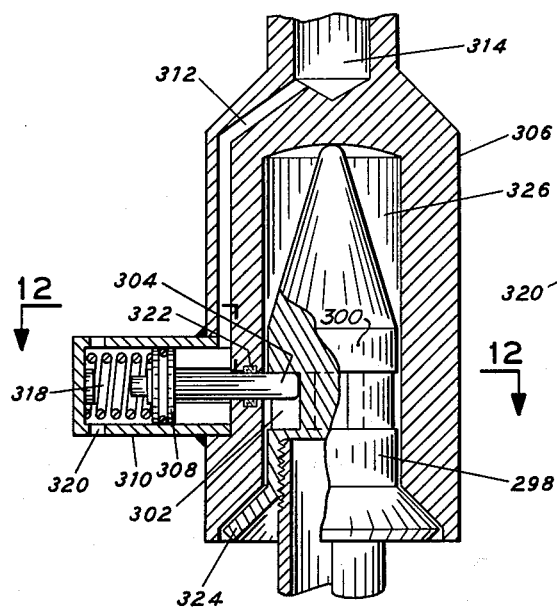
FIG. 11 illustrates in side elevation and partly in section details of a detachable connecter which may be used to lower the wellhead control equipment from the surface platform by a string of drill pipe.
Figure 12:
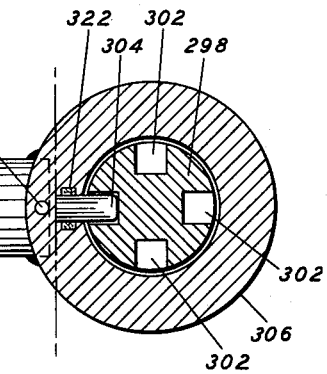
FIG. 12 represents a plan view through the detachable connector taken along the line 12—12 of FIG. 11.

Referring to FIGS. 9 and 11, the wellhead control equipment assembly has screwed on to its uppermost end a cap 298 which forms a closure for the upper end of the tubing in this equipment. This cap has a solid cylindrical portion 300 which has radially inwardly directed recesses 302 formed in it to receive a pin 304. The pin is carried by an attachment 306 and is connected to a piston 308 within a cylinder 310 which is disposed to permit the pin to move radially with respect to the attachment. A conduit 312 for hydraulic fluid is formed in the body of the attachment 306 and communicates at one end with one side of the cylinder 310 and at the other end with an axially disposed conduit 314, which latter communicates with a passage 316 through the rotary element 224. A helical spring 318 is placed in the other side of the cylinder and bears against the piston 308 to force the pin 304 in a radially inwardly direction. Relief ports 320 are formed through the wall of the spring side of the cylinder to permit the piston to be forced radially outwardly against the spring action when a hydraulic fluid is forced into the appropriate end of the cylinder. A packing 322 prevents leakage of the hydraulic fluid around the pin.

The cap 298 is formed with a conical tip in the manner of the actuator elements described heretofore and has an outwardly flared skirt portion 324 at its lower end. The attachment 306 has an axially disposed recess 326 formed in it and proportioned to receive and nest over the cap 298. The lower open end of the recess 326 is tapered outwardly to form a guide funnel which in conjunction with the tapered tip of the cap will assist the parts in coming together, under conditions which will be explained hereinafter.

When the wellhead control equipment is to be lowered onto the submerged wellhead apparatus, the transverse guide member 230 illustrated in FIG. 10 preferably is employed. The attachment 306 is secured to the lower end of the rotary element 224, and the cap 298 is secured to the top end of the wellhead control equipment. The pin 304 of the attachment is retracted, the attachment is nested over the cap, and the pin is then extended to seat in a recess 302 of the cap to hold the cap and hence the wellhead control equipment connected to the attachment. The pin in engagement with the recess both supports the weight of the wellhead control equipment and enables the cap to be screwed onto or off of the top of it, by rotation of the string of drill pipe.

A string of drill pipe as explained heretofore is made up on the drilling platform while the transverse guide member and the wellhead control equipment suspended from it are lowered through the water and guided to the submerged wellhead apparatus. The production and control lines 238 and 234, respectively, are initially spooled on winches and lowered from the vessel, or from an adjacent workboat, with enough slack left in them so that they will not interfere with the proper aligning and connection of the wellhead control equipment with the submerged wellhead apparatus.

The upper half 240 of the coupling has extending radially from it a positioning member 328 which preferably terminates at its radially outer end in a pin 330. This pin is designed to engage a positioning structure 332 which is securely fixed to and is a part of a fixed wellhead apparatus. The upper end of the positioning structure is made with a bifurcated element 334 at the top of it, one side 336 of which projects upwardly above the upper end of the other side 338. The upper edge of each side of this bifurcated element tapers inwardly toward the center thereof as at 340, to direct the positioning pin 330 between the arms of the bifurcation if it should contact the upper edge of either side thereof.

As the coupling half 240 connected to the lower end of the wellhead control equipment approaches the fitting 50 and while the pin 330 is still above the position of either arm of the bifurcated element, the angular orientation of the positioning pin with respect to the positioning structure 332 is observed with a submerged adjustably mounted television camera 342. If the pin is not in alignment to fall between the arms of the positioning structure the string of drill pipe is rotated at the surface platform to place the pin approximately in the desired position. The string of drill pipe is then lowered until the positioning pin 330 is below the topmost portion of the arm 336 but above the topmost portion of the arm 338. The string of drill pipe is then rotated to bring the pin in contact with the vertical surface 344 of the arm 336 and while this contact is maintained the string is lowered until the positioning pin rests in the notch 346 of the positioning structure.

While the final stage of this operation is taking place the skirt portion 286 of the upper half 240 of the coupling will guide it over the fitting 50 and into alignment with the lower half of the coupling. Finally, as the positioning pin 330 enters the notch 344, the two halves of the coupling come together and rest on the sealing ring 296. The segments of the clamp 246 were placed in an open position while the equipment was on the surface platform and will not interfere with the coupling halves as they come together.

A hydraulic fluid is now forced down through the string of drill pipe 88 to power the piston 308 against the spring 318 and retract the pin 304 from the recess 302 in the cap 298 of the wellhead control equipment. The string of drill pipe, the transverse guide member 230 and the attachment 306 are now raised to the drilling platform and the transverse guide member is removed from engagement with the guide lines. Another transverse guide member such as the guide member 222 shown in FIG. 13 is now mounted on the guide lines and the rotary element 224, the operator element 228, and the string of drill pipe 88 with the appurtenances described heretofore incorporated in it are assembled together for lowering to the wellhead apparatus. It will be understood that the transverse guide member 222 selected for this purpose has been particularly constructed to engage the socket of the operator element 228 with the actuator unit 242 of the coupling when the operating tool is lowered and guided to the wellhead apparatus. This latter operation is now accomplished and when the actuator unit 242 is securely seated in the socket of the operator element 228, as observed by a submerged television camera which may be supported by the bracket 134 from guide member 222, the top portion of the string of drill pipe is rotated at the surface platform to close the segments of clamp 246 around the coupling member 262 and fitting 50 to secure them together against the packing ring 296 in a fluid-tight connection. The long-skirt portion 286 of the upper half of the coupling in conjunction with the long cylindrical portion 292 of the fitting 50 prevents the coupling halves from rocking on each other under the weight of the operating tool while the connection is being made.

After the wellhead control equipment, together with the production and control lines 234 and 238 respectively, is secured to the well opening as described heretofore, the three guide lines 54, 56 and 58 and the associated guide posts can be disconnected from the fixed portion of the submerged wellhead apparatus and returned to the surface platform. As described heretofore, the guide posts 64, 68 and 70 are rigidly secured at their lower ends to an auxiliary base 60 which is detachably connected to the fixed base 46 which latter is fixedly secured to the well casing and remains a permanent part of the submerged wellhead apparatus.

As shown in FIG. 20, which represents the base portion of the apparatus with the fitting 50 removed from it, the fixed base 46 has a cylindrical portion 348 extending vertically above it to the top of which a radially extending collar 350 is affixed in a unitary manner. The disconnectable portion or auxiliary base 60 is made in plan view in the form of a ring which fits loosely around the periphery of the collar 350 and carries a means for detachably interlocking it with the collar.

The auxiliary base portion 60 has a segment removed from one side of it, in the region indicated by numeral 352, FIG. 19, to provide clearance for portions of the submerged wellhead apparatus, such as for example, the production and control lines 234 and 238, which remain attached to the well when the removable base portion 60 is lifted from the fixed wellhead apparatus. This form of base portion 60 also enables the guide lines to be lowered and re-attached to the submerged wellhead if at some later time the well is to be worked on.

FIGS. 19 to 21 illustrate one means for disconnectably securing the auxiliary base portion 60 to the fixed base portion 46. A plurality of actuator elements, illustrated by the actuator element 354, similar in form to the actuator elements 100 described heretofore, are rotatably mounted in the auxiliary base portion 60 in bearings 356 and 358 and positioned radially outwardly from the inner circumferential edge 360 of this base portion.

The shaft 362 of the actuator element is screw-threaded as at 364 in the region between its bearing supports and carries a dog 366 which has complementary screw threads mating with the screw threads 364 of the actuator element. Thus, as the actuator element is rotated, the dog 366 will move upwardly or downwardly on the shaft thereof. The mating screw threads between the dog and the actuator element engage with enough friction so that when the actuator element is rotated, and provided the dog is not against an abutment, the dog will be carried around in rotation with the shaft.

When the actuator element is rotated in a counterclockwise direction as viewed in FIG. 19, the dog 366 meets an abutment 368 recessed in the base portion 69 which holds the dog relatively stationary in rotation while it is screwed downwardly relative to the shaft of the actuator element. When the actuator element is screwed in a clockwise direction as viewed in FIG. 19, the dog is rotated into a contact with an abutment 370 formed in the peripheral wall 372 of the base portion 60, at which time the dog extends from the wall of the auxiliary base radially inwardly toward the center of the wellhead apparatus and projects under the collar 350 of the fixed base section. Continued rotation of the actuator element in a clockwise direction causes the dog to move upwardly relative to the shaft of the actuator element and finally to engage the lower surface 374 of the collar thereby securing the removable base portion 60 to the fixed base portion 46.

To disconnect the removable base portion 60 from interlocking relationship with the fixed wellhead apparatus, the actuator element 354 is rotated in a counterclockwise direction to move the dog 366 downwardly relative to the actuator shaft so that it becomes disengaged from its contact with the lower surface 374 of the collar 350 and subsequently moves in rotation with the rotating element until it comes against the abutment 368 at which time it is buried within a recess in the removable base portion and is entirely clear from interfering with the removal of this base portion from the fixed base portion 46.

In disconnecting the auxiliary base portion from the fixed base, the tool described heretofore is lowered from the vessel and guided by the particularly constructed transverse rigid guide member 375 to engagement with the actuator unit 354 and the top of the string of drill pipe is turned at the vessel to turn the actuator unit in the proper direction to clear the dog 366 from engagement with the collar 350 as described heretofore. This is done for each of the dogs in turn, in each case a transverse guide member being used which is particularly constructed to seat the operator element 377 on the selected actuating unit.

When all of the dogs 366 on the auxiliary base portion 60 have been rotated into this base portion and cleared from contact with ring 350, this base portion can be lifted by the guide lines and cleared from the fixed wellhead apparatus.

The removable base portion 60 has an extension 376 projecting radially from it and with a vertical passage 378 through it surrounding the rigid positioning pilot post 72 which is securely fixed at its lower end to the base portion 46. The pilot post is disposed vertically in parallel alignment with the positioning posts 74 and 76, which also are securely fixed at their lower ends to the fixed base 46, and has at its topmost end a detachable connector 380 for connecting a pilot line 382, FIG. 1, to it. Ordinarily, when the guide lines are attached to the submerged wellhead apparatus and are being used for guiding equipment to the submerged wellhead, the pilot line will not be connected to the top of its post. Preferably, this line is connected and used as a special guide line when it is desired to raise the three principal guide lines 54, 56, and 58 and the disconnectable base portion 60 to the vessel or when it is desired to lower the guide line assembly for attachment to the fixed wellhead apparatus.

When the offshore well has been completed and is ready to be placed on production, the pilot line 382 is attached to its post and the top end of it is carried through the trunk 34 of the vessel, the buoy 384 shown in FIG. 1 being disconnected from the pilot line at this time, and connected to an appropriate winch which pulls it taut. The auxiliary base portion 60 is then disconnected from the fixed base portion 46 by using the operating tool in the manner explained heretofore and raised to the vessel, the rigid positioning posts 74 and 76 in conjunction with the pilot post 72 restraining it from swinging and damaging the wellhead control equipment as it moves upwardly past it. As it clears the tops of the positioning posts, it is guided by the pilot line 382 into the trunk of the vessel. The top of the pilot line is then disconnected from the vessel and attached to the buoy 384 and the production and control lines 234 and 238 are disconnected from the buoy 386 and from the vessel and are connected to a fixed platform installation or carried to the shore. The vessel 30 can now depart from the well site leaving the pilot line 382 attached to the submerged wellhead with the buoy 384 as a marker.

Figure 22:
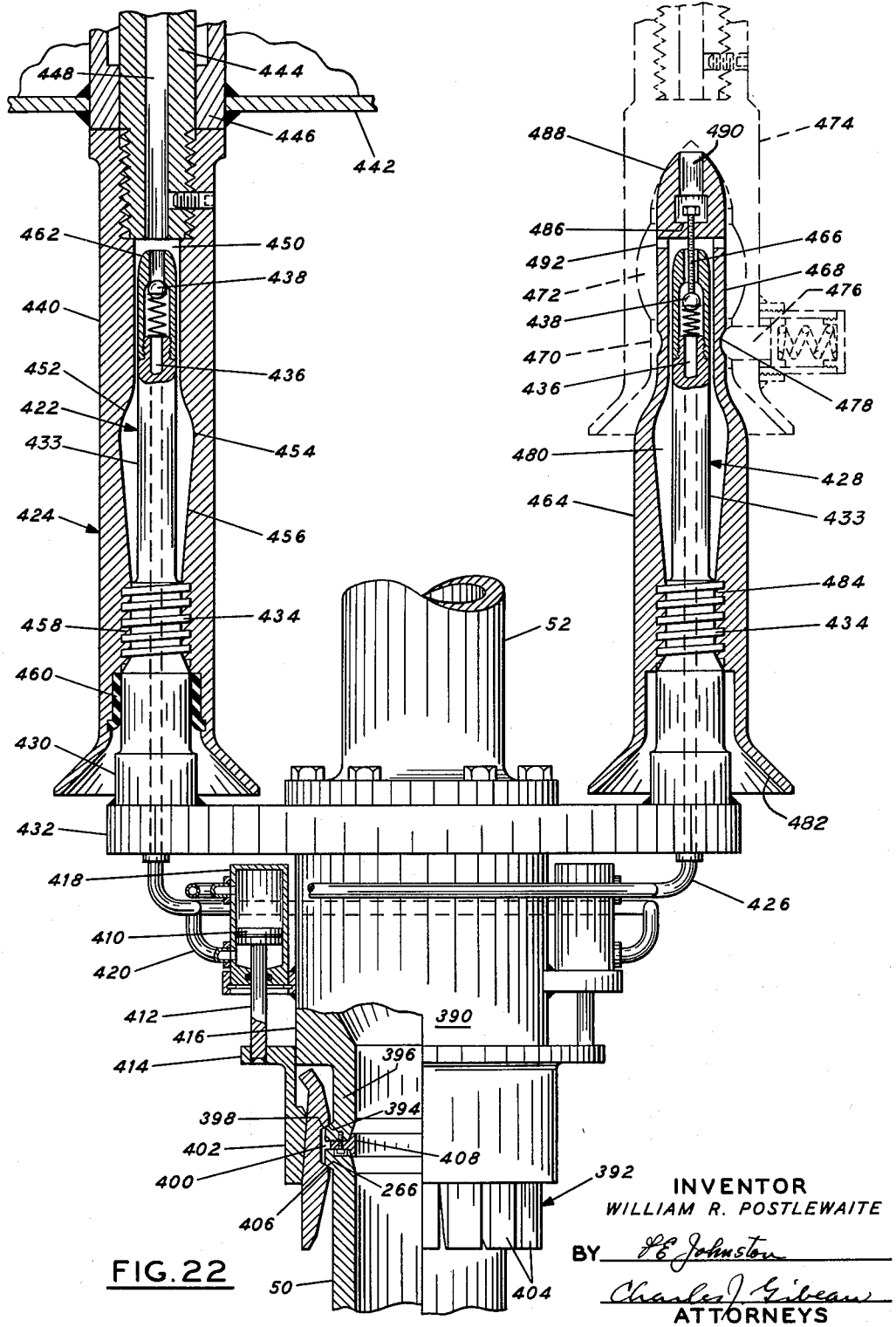
FIG. 22 illustrates in side elevation and partly in section another modification of a clamp means for securing well head control equipment to the well opening and also a modification of an operator tool which employs hydraulic pressure to actuate the submerged wellhead apparatus.

FIG. 22 illustrates an embodiment of the invention in which the operating parts of the submerged wellhead apparatus are actuated by a hydraulic fluid and a connection for coupling the hydraulic conduits to the wellhead apparatus is made up between a connector half which is fixed on the submerged wellhead apparatus and a complementary connector half which is placed on the lowest portion of the operating tool in place of the socket member described heretofore. In this embodiment of the invention a rigid transverse guide member is used to guide the corresponding connector half down to the wellhead in alignment with the particular complementary connector member in the manner described heretofore in conjunction with the other embodiments of this invention.

FIG. 22 illustrates a form of clamp which may be used to connect the wellhead control equipment to the well opening for the same purpose as and in the environment of the coupling procedure illustrated in FIGS. 9 and 13. In the present embodiment the upper section 390 of the coupling has mounted at the lower end of it a segmented ring 392 which rests on the radially outwardly extending tapered shoulder 394 of the coupling section 396 by contact with the corresponding complementary surface 398 which forms one side of the annular channel 400 formed in the radially inner surface of the ring segments. A second continuous ring 402 bears against the circumferential outer surface of the segmented ring 392 and maintains the segments assembled in ring form on the coupling section. The inner circumferential surface of the ring 402 tapers downwardly and outwardly to provide a wedging action on the ring segments 404 when the ring 402 is forced downwardly over the segments and forces the latter radially inwardly thereby decreasing the inner diameter of the segmented ring.

The fitting 50 is described heretofore has near its upper end a radially extending tapered surface 266 and the channel 400 in the segmented ring is formed with a complementary tapered side 406 to engage this surface. Thus, as the continuous ring 402 is forced downwardly on the segmented ring, the tapered surfaces 398 and 406 on the segmented ring engage respectively the complementary surfaces 394 and 266 on the upper and lower coupling sections and force the coupling sections together to compress the packing ring 408 between them in a fluid-tight seal.

When the continuous ring 402 is forced upwardly on the segmented ring, the latter rocks on the surface 394 of the upper coupling section, the wedging action of the ring 402 forcing the upper ends of the segments radially inwardly and thus displacing the lower ends of the segments radially outwardly. Thus, the segmented ring is opened either to unclamp the coupling halves or to prepare the upper coupling section to receive the lower section.

The power to move the wedging ring 402 over the segmented ring 392 is supplied by a plurality of pistons 410 which are connected through the rods 412 to the radially outwardly projecting flange 414 formed on the upper part of the ring 402. This ring has sufficient depth to overlap and be guided by the cylindrical portion 416 of the upper coupling section. The pistons 410 are confined in cylinders 418 and the lower internal ends of all the cylinders are manifolded together by a conduit 420 which leads to and is in communication with the lower section 422 of the hydraulic connector 424, which lower section is affixed to and is a part of the structure of the wellhead control equipment 232. Likewise, the upper internal ends of all the cylinders are manifolded together by a conduit 426 which communicates with the lower section 428 of a complementary hydraulic connector which also is attached to the wellhead control equipment. Thus, when a hydraulic fluid is forced downwardly through the connector 424 and through the complementary lower section 422, the hydraulic pistons 410 are powered upwardly to open the segmented ring 392, and when the hydraulic fluid is forced downwardly through the connector section 428, the hydraulic pistons are powered downwardly to close the segmented ring.

The connector sections 422 and 428 are of similar construction. Each is formed with a cylindrical base portion 430 which is fixedly secured to the flange 432 affixed to the wellhead control equipment above the upper section 390 of the clamp. A cylindrical stem 433 projects vertically upwardly from the base portion and at the bottom of the stem coarse screw threads 434 are formed in a position to be spaced apart upwardly from the flange 432 when the connector section is mounted on it. An axially disposed conduit 436 is formed through the stem and base portions and communicates with the manifold 426. A spring pressed ball check valve 438 closes the upper end of the conduit 436 against hydraulic pressure directed upwardly through the stem and permits the conduit to be opened by hydraulic pressure directed downwardly into the stem.

The upper section 440 of the coupler 424 is carried by the operating tool and extends vertically downwardly from the rigid transverse guide member 442. It is connected to the bottom end of the rotary element 444 which is journaled in the bearing 446 on the guide member in a manner explained heretofore. A passage 448 is formed axially through the rotary element, communicating at its upper end with the interior of the string of drill pipe and at its lower end with the chamber 450 within the upper connector section 440. The lowermost end of the upper connector section is formed with a flared skirt the interior surface of which forms a funnel leading to the chamber 450 and assists in guiding the movable upper connector section 440 over the fixed lower connector section 422 as the parts come together.

The upper end portion of the chamber 450 is a cylindrical bore, which when the parts are assembled together, closely approaches the cylindrical outer wall of the upper portion of the stem 433. Below this cylindrical bore portion, the inner wall of the chamber diverges radially outwardly in a gentle taper as indicated at 452 and then through a merging curved portion 454 converges radially inwardly toward the bottom of the connector section, as indicated by the numeral 456. At the bottom end of the converging section 456, screw threads 458 are formed in the interior circumferential wall of the chamber to mate with the screw threads 434 at the base of the stem 433. A packing element 460 is secured in the lower portion of the chamber 450 to seal against the cylindrical base portion of the mating connector section 422 when the parts are assembled together.

The walls of the inner chamber 450 of the upper connector section 440 are shaped in the manner described heretofore to engage the rounded tip 462 of the stem 433 if the upper and lower connector sections are not in coaxial alignment when they are brought together. The tapered shapes of the mid-portion of the chamber 450 will place a transverse force on the tip of the stem which will cause the parts to be brought into coaxial alignment without creating undue friction between them when the tip of the stem finally rests in the cylindrical bore at the top of the chamber.

The parts are proportioned so that the connector sections will be in coaxial alignment prior to the time the screw threads 458 on the upper section are lowered into a position to engage the complementary threads 434 on the lower section. Thus, with parts in coaxial alignment, by rotating the string of drill pipe at the surface platform, the threads can be screwed together to securely engage the connector sections together in a connection which will not part under the pressure of hydraulic fluid which subsequently will be pumped down to it. While the screw threads are being engaged, the packing element 460 moves into the position where it forms a fluid-tight seal against the escape of hydraulic fluids from the chamber 450.

In order to provide for the release of the hydraulic fluid already trapped in the cylinders 418 from a previous operation of the clamp, the ball check valve 438 of the lower connector section 428, which is connected to the manifold 426, must be open to permit this fluid to escape. This is accomplished by a device 464 which is screwed onto the coupler section 428 and which carries a threaded pin 466 to press against the ball and displace it from its position closing the conduit 436.

The device 464 has an upper portion 468 which is square in cross section and engages the square portion 470 of the socket chamber 472 formed in the operator element 474 shown in phantom lines in FIG. 22. The device is held in the socket by means of the spring pressed round nosed catch 476 which rests in a detent 478 formed in the outer wall of the device 464.

The device has an inner chamber 480 corresponding in form and function to that described for the hydraulic connector section 440 and a funnel-shaped skirt portion 482 to help guide it onto the stem 432 of the connector section 428. Screw threads 484 formed in the lower chamber portion of the device mate with complementary screw threads 434 of the connector section to hold the device engaged with the latter.

The device 464 has a wall 486 formed across the top of the chamber 480 and through the wall is threaded the pin 466. The upper end of the device has a round nose 488 which is complementary to the rounded top of the socket chamber 472 in the operator element 474 and assists both in seating the operator element over the device and in keeping the parts in coaxial alignment when they are nested together. An axial opening 490 is formed through the nose of the device to make the threaded pin 466 accessible to adjustment.

The pin is adjusted to extend downwardly from the wall 486 a sufficient distance to unseat the ball 438 and open the conduit 436 through the connector member 428 for the escape of the hydraulic fluid therefrom. Ports 492 are formed through the wall of the device into the chamber 480 to permit the hydraulic fluid to escape therefrom.

When the wellhead control equipment, to the bottom of which the upper half 390 of the coupling is attached, is to be secured to the fitting 50, the arrangement of parts is the reverse of that illustrated in FIG. 22. The device 464 may be screwed onto the connector section 422 while the equipment is still at the surface of the water and is lowered to the submerged wellhead apparatus along with the wellhead control equipment. An operating tool is then made up and lowered and guided to the submerged wellhead control equipment to place the hydraulic connector section 440 on and secured to the complementary connector section 428. Hydraulic fluid is then pumped down through the string of drill pipe to operate the pistons 410 and force the segmented ring 392 to close on the coupling sections in the manner described heretofore. The operating tool is then returned to the surface platform and assembled with the appropriate transverse guide member and with the operator element 474 on the lower end of it and this element is guided down to and latched over the device 464. The string of drill pipe is then rotated at the surface platform to unscrew the device 464 from engagement with the connector section 422 after which it is retracted from this connector section and raised with the operating tool to the surface platform.

If the clamp is to be released to disengage the wellhead control equipment 232 from its connection with the fitting 50, the device 464 is engaged in the socket of the actuator element 474 at the surface platform and guided down to and connected with the connector section 428, which is the arrangement which appears in FIG. 22. The string of drill pipe is then raised upwardly, unseating the pin 476 from the detent 478, and the operating tool returned to the surface platform. Here the operating tool is reassembled on the appropriate transverse guide member 442 and with the appropriate connector section 424 secured on the bottom end of it and is lowered down and guided over the coupler section 422 to which it is then connected. A detailed operation of the device for this condition has been described heretofore.

It will be apparent that when a means is provided for connecting together at the submerged well apparatus conduits for carrying a hydraulic fluid to it, then fluid motors of various forms can be used for connecting and disconnecting and otherwise operating the various components of the submerged wellhead apparatus in place of some or all of the mechanically operated devices described heretofore.

Figure 23:
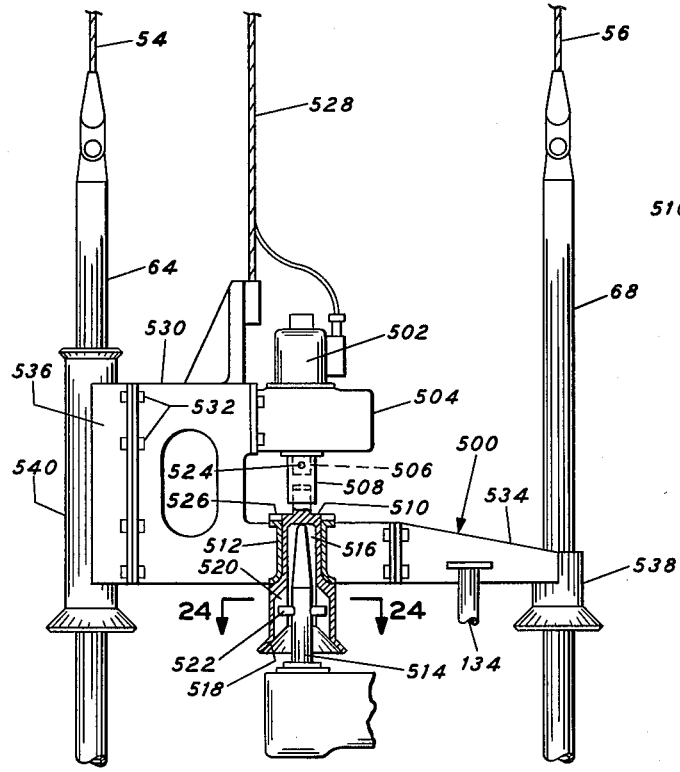
FIG. 23 represents in side elevation and partly in section a modification of an operator tool made in accordance with this invention.
Figure 24:
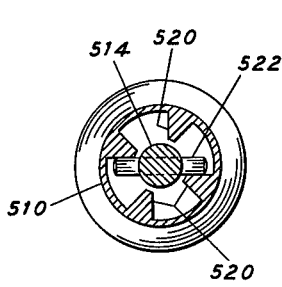
FIG. 24 illustrates in plan view details of the connection between the operator element and the actuator unit, taken along the line 24—24 of FIG. 23.

FIGS. 23 and 24 illustrate another embodiment of an operating tool useful in this invention. In this embodiment a rigid transverse guide member 500 is mounted across and in slidable connection with at least two of the plurality of guide lines and carries on its a remotely operable motor 502 which is illustrated as being an electric motor but may be a hydraulic motor, air motor, or other suitable type. The motor is connected through a gear train in gear case 504 with a rotary shaft 506 and this shaft is connected through a sleeve 508 with the top end of a rotary element 510. The rotary element is journaled in the bearing 512 mounted on the transverse member in a position to engage an actuator unit 514 when the tool is lowered from the surface platform and guided to the submerged wellhead apparatus.

The rotary element 510, which in this embodiment also is the operator element of the tool, has an axial chamber 516 formed in it to receive the upwardly projecting actuator unit and the lowermost end of the chamber is formed as a funnel 518 to assist in guiding the parts together. The lower portion of the chamber 516 is formed with vertically disposed fins 520 projecting radially inwardly from its wall to receive and engage in driving relationship the transverse pin 522 which is secured to and projects radially from the actuator element. This construction permits the parts to come together without precisely aligning the meshing parts between the rotary element and the actuator unit.

In order to limit the amount of torque placed on the actuator unit by the motor 502, the sleeve 508 is connected to the stub shaft 506 by a shear pin 524 which is dimensioned to shear under a predetermined load. When the pin is sheared, the collar 508 is captured between the gear case and the top of the rotary element 510 and the rotary element is held in the bearing 512 by the retaining ring 526.

The lifting and lowering line 528 is connected to the upper portion of this tool in substantial alignment with the center of gravity of the latter so that the transverse guide member will not tilt and tend to bind on the guide posts as it is lowered over them nor displace the operator element at a greater angle to the vertically directed actuator unit 514 than can be accommodated by the dimensions of the parts. When an electric motor is used on this device the line 528 may be a strengthened cable which carries the electrical conductors to the surface platform and has enough tensile strength built into it to carry the weight of the remainder of the tool.

Preferably, the motor, gear case and associated rotary element are mounted on a central detachable portion 530 of the transverse guide member in a manner, such as by the bolts 532 indicated, to be connected to end portions 534 and 536 which carry the respective guide sleeves 538 and 540. These end portions are dimensioned to place the socket of the operator element 510 directly over and in vertical alignment with a selected actuator unit. The tool is then lowered from the surface platform and guided onto the selected actuator unit and the cable slackened off so that the heaving of the vessel will not affect the operation of the tool. The motor 502 is then placed in operation to rotate the actuating unit in the desired direction and to the degree required to effect the operation at the submerged wellhead apparatus. The tool is then raised to the surface platform and prepared for its next operation.

It is apparent from the foregoing description of various embodiments of this invention and their method of operation that it achieves the objects set forth heretofore and provides a means for connecting, disconnecting, adjusting and otherwise working on submerged wellhead apparatus, all from a surface platform and without the aid of divers.

It is apparent also that other modifications than those described herein may be made to the apparatus of this invention without departing from the inventive concept. Therefore, it is intended that the invention embrace all equivalents within the scope of the appended claims.

I claim:

1. The method of working on submerged wellhead apparatus having adjustable portions therein from a floating vessel which is positioned on the surface of a body of water comprising:

(a) fixedly securing in relation to a submerged wellhead apparatus a plurality of rigid guide posts having respective flexible guidelines connected between the top end thereof and a vessel floating on the surface of a body of water, (b) which said flexible guidelines enable said vessel to move on said surface while remaining connected to said submerged wellhead apparatus, (c) lowering on said guidelines from said vessel a transverse guide member to which is connected the lower end of a string of drill pipe having a rotatable operator element secured to the end thereof for engagement with a rotatably adjustable complementary portion of said wellhead apparatus, (d) placing a weight on the lower end portion of said string of drill pipe of a sufficient amount to prevent substantial curvature of said string of drill pipe in the region between said weight and a support on said vessel for the upper end of said string of drill pipe, (e) to dispose said string of drill pipe substantially in a straight line between said transverse guide member and said vessel when said vessel is displaced laterally from a position vertically above said wellhead apparatus, (f) lowering said transverse guide member and the connected said lower end of said string of drill pipe on said guide posts and engaging said operator element with said complementary rotatably adjustable portion of said wellhead apparatus, and (g) rotatably displacing said upper end of said string of drill pipe at said vessel to adjust said complementary rotatably adjustable portion of said wellhead apparatus.

2. The method of working on submerged wellhead apparatus having adjustable portions therein from a floating vessel which is positioned on the surface of a body of water comprising:

(a) fixedly securing in relation to a submerged wellhead apparatus a plurality of rigid guide posts having respective flexible guidelines connected between the top end thereof and a vessel floating on the surface of a body of water, (b) which said flexible guidelines enable said vessel to move on said surface while remaining connected to said submerged wellhead apparatus, (c) lowering on said guidelines from said vessel to adjacent the top ends of said guide posts a transverse guide member to which is connected the lower end of a string of drill pipe having an operator element secured to the end thereof for engagement with a selected complementary adjustable portion of said wellhead apparatus while retaining the upper end of said string of drill pipe on said vessel, (d) determining the lateral displacement of said vessel from a position vertically above said wellhead, (e) placing a transverse force against the upper portion of said string of drill pipe to curve said upper portion toward said wellhead in a direction to compensate for said lateral displacement of said vessel and to dispose the lower end portion of said string of drill pipe substantially vertically above said wellhead, (f) lowering said transverse guide member and the connected said lower end of said string of drill pipe on said guide posts and engaging said operator element with said selected adjustable portion of said wellhead apparatus, and (g) using said upper end of said string of drill pipe at said vessel to operate said operator element to adjust said selected adjustable portion of said wellhead apparatus.

3. A method for adjusting submerged wellhead apparatus which has a plurality of laterally spaced-apart actuating units operatively connected respectively to adjustable devices of said wellhead apparatus comprising:

(a) connecting between a surface platform and a submerged base means a flexible guide means which includes as the lowermost portion thereof a plurality of vertically disposed laterally spaced-apart rigid guide posts fixably connectable adjacent to and in a known relationship to submerged wellhead apparatus, (b) slidably mounting a guide element on said guide means, (c) mounting the lower end of an operating tool on said guide element and in a position to be substantially in vertical alignment with a selected one of said actuating units when said guide element together with the said lower end of said operating tool mounted thereon is lowered into engagement with at least two of said guide posts, (d) connecting an upper portion to said lower end of said operating tool and in tool operating relationship therewith to operate said lower end by the operation of said upper portion, (e) lowering said operating tool and said guide element downwardly from said platform along said flexible guide means and said guide posts and engaging the lower end of said operating tool in operating relationship with said selected actuating unit while retaining the upper end of said upper portion of said operating tool on said platform, and (f) operating said upper end at said platform to operate thereby said lower end of said operating tool and the said selected actuating unit engaged therewith and adjusting a selected adjustable device of said wellhead apparatus.

4. The method of using a string of drill pipe as a component of a tool operated from a platform on the surface of a body of water for operating on submerged wellhead apparatus which has a plurality of spaced apart actuating units operatively connected to respective adjustable portions of said wellhead apparatus comprising:

(a) connecting a plurality of guide means between a platform at the surface of a body of water and a wellhead apparatus submerged in said body of water to dispose the lower ends of said guide means adjacent to and in a known relationship to spaced apart actuating units on said apparatus, (b) providing for each of said actuating units a complementary guide arm means which is formed to engage simultaneously selected ones of said guide means and the lower end of said string of drill pipe to guide said lower end into alignment wtih a selected one of said operating units, (c) securing an operator element to the lower end of said string of drill pipe, (d) lowering said string of drill pipe and said operator element with a selected said guide arm means from said platform and guiding the said operator element into operating engagement wtih said selected one of said actuating units while retaining the upper end of said string of drill pipe at said platform, and (e) using said string of drill pipe to operate said operator element and the said selected actuating unit in engagement with said operator element.

5. The method of using a string of drill pipe as a component of a tool operated from a platform on the surface of a body of water for operating apparatus submerged at the bottom of said body of water comprising:

(a) connecting to the opening of a submerged well bore wellhead apparatus which is constructed with a plurality of spaced-apart control means therefor, (b) the individual control means of said plurality each being operatively connected to a respective actuating means which is exposed at the outer surface of said apparatus and constructed for operation of the respective said control means by rotation about a substantially vertical axis, (c) establishing a platform at the surface of said body of water above said apparatus, (d) extending a plurality of guide means downwardly from said platform and fixedly securing the lower ends of said guide means adjacent to said apparatus with each single guide means of said plurality oriented in a predetermined lateral and angular relationship to said apparatus, (e) mounting a rigid guide arm structure transversely across at least two of said single guide means of said plurality for guided movement along said guide means, (f) mounting an operator means in a transversely fixed position on said guide arm structure by means which permit said operator means to be rotated about its vertical axis, (g) which said fixed position is selected to place said operator means in substantially vertical alignment with a complementary selected one of said actuating means on said apparatus, (h) connecting the lower end of a string of drill pipe to said operator means on said guide arm means and in substantially vertical alignment therewith, (i) lowering from said platform and along said plurality of guide means said guide arm means with said operator means and the said lower end of said string of drill pipe attached thereto while retaining the upper end of said string of drill pipe at said platform until said operating means engages said complementary selected one of said actuating means, (j) providing means to prevent relative rotation between said operator means and said actuating means engaged therewith, (k) rotating said string of drill pipe at said platform and thereby rotating said operator means and the said actuating means engaged therewith and controlling the operation of the complementary one of said plurality of control means for said apparatus by such rotation, and (l) subsequently disengaging said operator means from said actuating means engaged therewith while raising said string of drill pipe, said guide arm means and said operator means to said drilling platform.

6. The method of working on wellhead apparatus which is submerged within a body of water below a platform at the surface thereof and wherein a plurality of laterally spaced-apart first guide means is connected between the said platform and the submerged wellhead apparatus comprising:
(a) providing respective actuating means accessible at the exterior surface of said wellhead apparatus and operatively connected to a respective each of a plurality of separate adjustable devices in said wellhead apparatus,
(b) disposing said respective actuating means to be engaged selectively in operating relationship by an operator end of an operating tool when said operator end is lowered substantially vertically onto a selected one of said actuating means,
(c) mounting a second guide means transversely across at least two of said plurality of said first guide means for guided movement along said first guide means,
(d) positioning said guide operator end of said operating tool on said second guide means in a position to engage a selected one of said actuating means on said wellhead apparatus when said second guide means is lowered from said platform along said first guide means to said wellhead apparatus,
(e) lowering and guiding said second guide means and said operator end mounted thereon from said platform to said wellhead apparatus and engaging said operator end with said selected one of said actuating means,
(f) remotely operating said operating tool from said platform and adjusting the one of said adjustable devices which is complementary to said selected one of said actuating means, and
(g) subsequently raising said second guide means and said operator end mounted thereon to said platform.

7. The method of using a string of drill pipe as a detachable hydraulic conduit for controlling the operation of wellhead apparatus submerged at the bottom of a body of water from a platform on the surface of said body of water comprising:
(a) connecting a fixed relationship to the opening of a submerged well bore wellhead apparatus which is constructed with a plurality of spaced-apart hydraulically operated control means therefor, operatively connecting to said control means through an interior passage in fluid communication therewith respective first connector parts for the connection of a hydraulic conduit thereto, placing said first connector parts at the outer surface of said apparatus and positioned to be engaged in fluid-tight relationship by a complementary second connector part which is lowered in a substantially vertical direction onto a said first connector part,
(b) establishing a platform at the surface of the body of water above said wellhead apparatus,
(c) extending a plurality of guide means downwardly from said platform and fixedly securing the lower ends of said guide means at said wellhead apparatus with each single guide means of said plurality fixed in a predetermined relationship with respect to said apparatus,
(d) mounting a guide member transversely across at least two single guide means of said plurality for guided movement along said guide means,
(e) mounting a said complementary second connector part on said guide member and extending below said guide member in a position which is selected to place said second connector part in substantially vertical alignment with a selected one of said first connector parts on said wellhead apparatus when said guide member is lowered along said guide means from said platform to said wellhead apparatus,
(f) connecting the lower end of a string of drill pipe to said second connector part on said guide member and with the interior of said string of drill pipe in communication with an interior passage in said second connector part,
(g) lowering from said platform and guiding along said plurality of guide means said guide member with said second connector part and said lower end of said string of drill pipe connected thereto while retaining the upper end of said string of drill pipe at said platform,
(h) engaging said second connector part on said guide member and the complementary said selected one of said first connector parts on said wellhead apparatus in detachable fluid-tight connection and with said interior passage of said second connector part in fluid communication with said interior passage of said selected one of said first connected parts,
(i) forcing a hydraulic fluid down from said platform through said string of drill pipe and through the said interior passages of said interconnected connector parts and by said hydraulic fluid operating the complementary hydraulically operated control means in said wellhead apparatus, and
(j) subsequently disconnecting said interconnected connector parts and raising said drill string, said guide member and the said second connector part to said platform.

8. Apparatus for working on a submerged wellhead from a surface platform comprising:
(a) a submerged wellhead apparatus fixed at the opening of a submerged well bore,
(b) a plurality of adjustable devices in said wellhead apparatus,
(c) respective actuating units on said wellhead apparatus operatively connected to each of said adjustable devices for the adjustment of said adjustable devices,
(d) an operating tool for selectively operating each of said actuating units,
(e) each of said actuating units being disposed to be engaged in operating relationship selectively by said operating tool when said operating tool is lowered substantially vertically onto one of said actuating units,
(f) a platform at the surface of a body of water above said submerged wellhead apparatus,
(g) a plurality of spaced-apart guide means connected between said platform and said submerged wellhead apparatus,
(h) means to lower said operating tool from said platform,
(i) a second guide means mounted transversely across at least two selected ones of said plurality of guide means and engaging said operating tool at a predetermined fixed position on said second guide means to guide said operating tool along said at least two selected guide means of said plurality and into substantially vertical engagement with a preselected one of said plurality of said actuating units, and
(j) means for operating said operating tool remotely at said platform to thereby operate said preselected actuating unit to adjust the respective one of said adjustable devices operatively connected thereto.

9. Apparatus for working on a submerged wellhead comprising:
(a) a vessel floating on the surface of a body of water above a submerged well site,
(b) wellhead apparatus affixed to a well opening at the bottom of said body of water,
(c) a plurality of rigid guide posts affixed to said wellhead apparatus and extending vertically therefrom and terminating within said body of water,
(d) a respective plurality of flexible guidelines with each guideline of said plurality connected between the top end of a corresponding guide post and said vessel,
(e) a transverse guide member constructed to engage in guiding relationship at least two of said plurality of guidelines, (f) a rotary element rotatably mounted on said guide member for rotation about a vertical axis, (g) an operator element connected to the lower end of said rotary element for rotation thereby about a vertical axis, (h) an axially disposed socket chamber in said operator element and having an opening to said chamber at the bottom end of said operator element, (i) an adjustable device in said wellhead apparatus, (j) an actuating unit mounted on said wellhead apparatus for rotation about a vertical axis and connected in operating relationship to said adjustable device, (k) means for lowering said transverse guide member from said vessel along selected said guidelines and over corresponding said guide posts and to said wellhead apparatus, (l) the position of said rotary element on said transverse guide member being preselected to place said socket chamber of said operator element in operating engagement with said actuating unit when said transverse guide means is lowered vertically to said wellhead apparatus, and (m) means connected to said rotary element and controlled at said vessel for rotating said rotary element.

10. Apparatus for working on a submerged wellhead which is connected to a vessel on the surface of the water by flexible guidelines comprising:

a vessel on the surface of a body of water, wellhead apparatus submerged at the bottom of said body of water, guidelines connected between said vessel and said wellhead apparatus, a transverse guide member adapted to be mounted in guiding relationship between at least two of said guidelines, an adjustable part in said wellhead apparatus, an actuating unit operatively connected to said adjustable part and mounted on said wellhead apparatus in a position spaced laterally apart from the axis of the submerged well, a rotary element positioned on said guide member to be in substantially vertical alignment with said actuating unit when said transverse guide member is lowered on said guidelines to said submerged wellhead, operative means on the lower end of said rotary element to detachably engage automatically said actuating unit in operating relationship when said transverse guide member is lowered on said guidelines to said submerged wellhead apparatus and to disengage said actuating unit automatically when said transverse guide member is raised from said wellhead apparatus, a string of tubing having the lower end thereof connected to said rotary element and extending upwardly therefrom to said vessel, and means on said vessel to adjust said adjustable part of said wellhead apparatus through said string of tubing when said operator means is engaged with said actuating unit.

11. Apparatus in accordance with claim 10 including support means on said vessel to support the upper end of said string of tubing, a weight mounted on the lower end of said string of tubing which weight is sufficient in amount to dispose said string of tubing in substantially a straight line between said support means and said weight when said transverse guide means is at said wellhead apparatus and when said vessel is displaced laterally from a position vertically above said wellhead apparatus.

12. Apparatus in accordance with claim 10 including means on said vessel to place a transversely directed force on the upper portion of said string of tubing to cause the said upper portion to curve in a direction to compensate for a lateral displacement of said vessel from a position vertically above said wellhead apparatus and to dispose the lower portion of said string of tubing in substantially vertical alignment with said wellhead apparatus.

References Cited by the Examiner

UNITED STATES PATENTS

| | | | |
|---|---|---|---|
| 2,909,359 | 10/1959 | Bauer et al. | 175—7 |
| 2,928,635 | 3/1960 | Wilson et al. | |
| 2,990,851 | 7/1961 | Jackson et al. | 137—595 |
| 3,052,299 | 9/1962 | Geer et al. | 166—66.5 |
| 3,086,590 | 4/1963 | Jackson et al. | 166—66.5 |
| 3,099,316 | 7/1963 | Johnson | 166—66.5 XR |
| 3,115,755 | 12/1963 | Siebenhausen | 175—5 XR |

CHARLES E. O'CONNELL, *Primary Examiner.*

BENJAMIN HERSH, *Examiner.*